Oct. 27, 1970   R. J. COREY   3,535,891
METHOD OF AND APPARATUS FOR MAKING NON-RUN REVERSIBLE KNIT-WEAVE
Original Filed Nov. 14, 1963   34 Sheets-Sheet 1

INVENTOR.
Robert J. Corey
BY

INVENTOR.
Robert J. Corey
BY

Oct. 27, 1970　　　　　　R. J. COREY　　　　　3,535,891
METHOD OF AND APPARATUS FOR MAKING NON-RUN REVERSIBLE KNIT-WEAVE
Original Filed Nov. 14, 1963　　　　　　　　34 Sheets-Sheet 3

INVENTOR.
Robert J. Corey
BY

INVENTOR.
Robert J. Corey

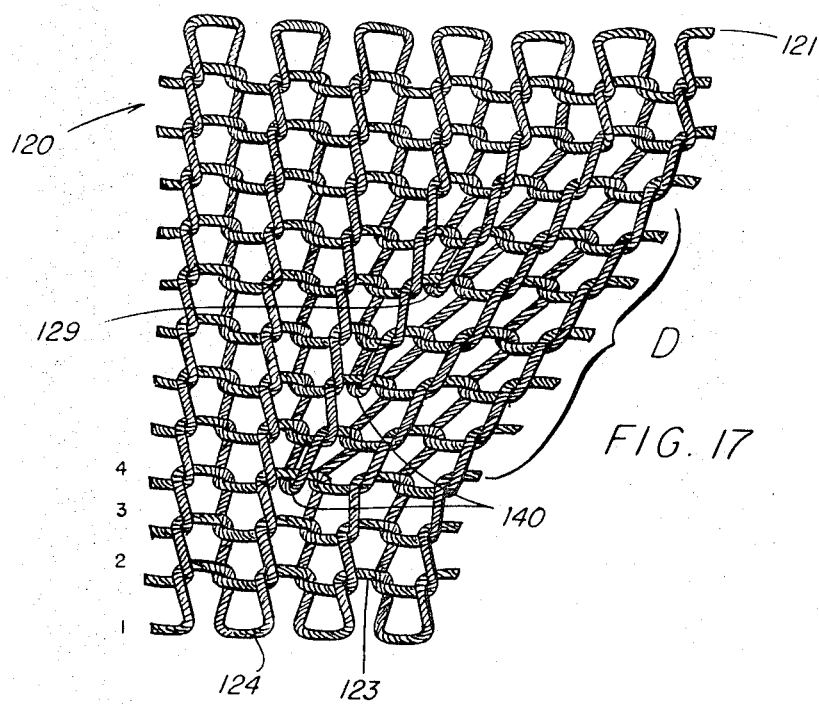
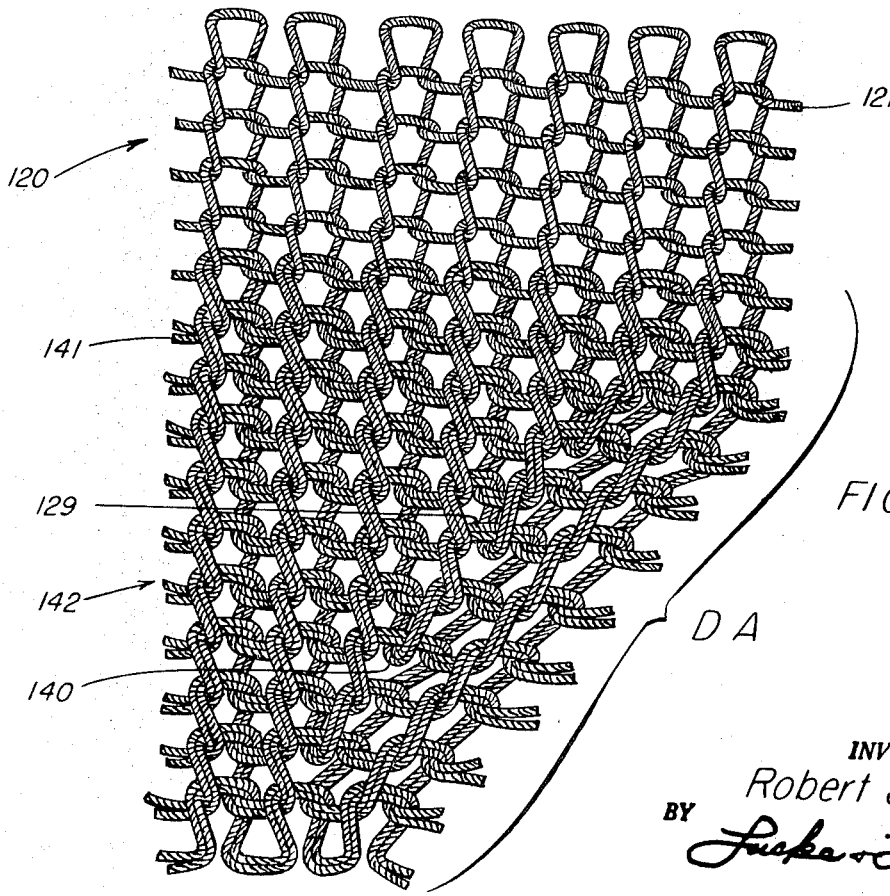

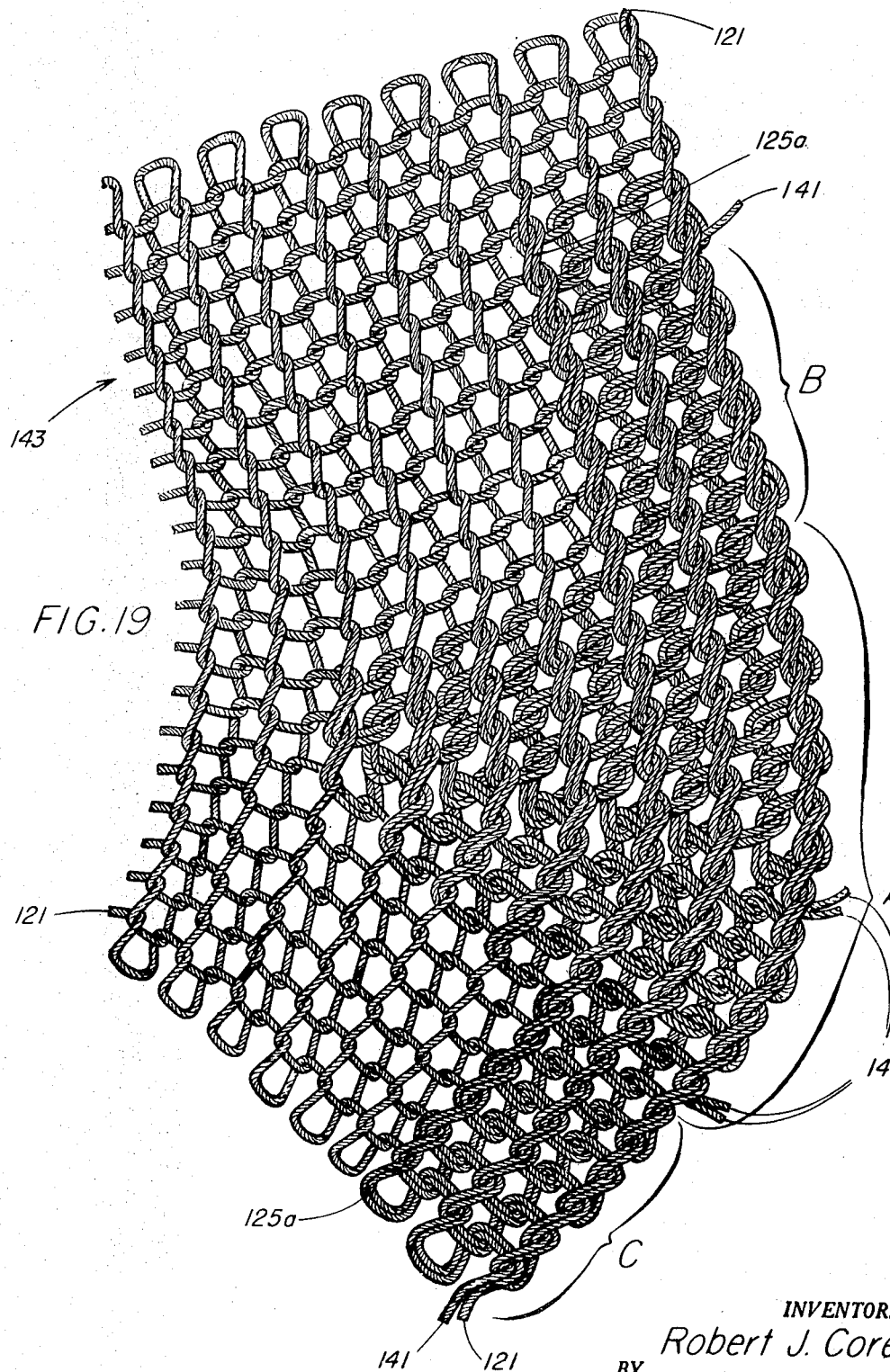

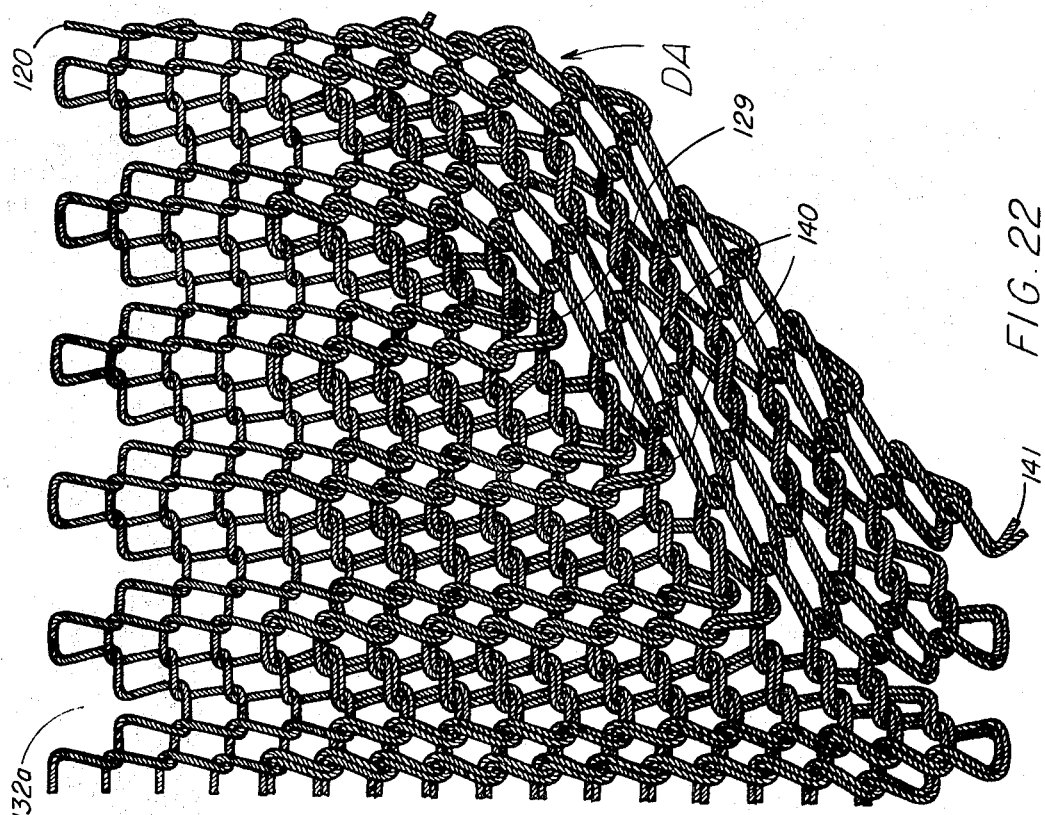
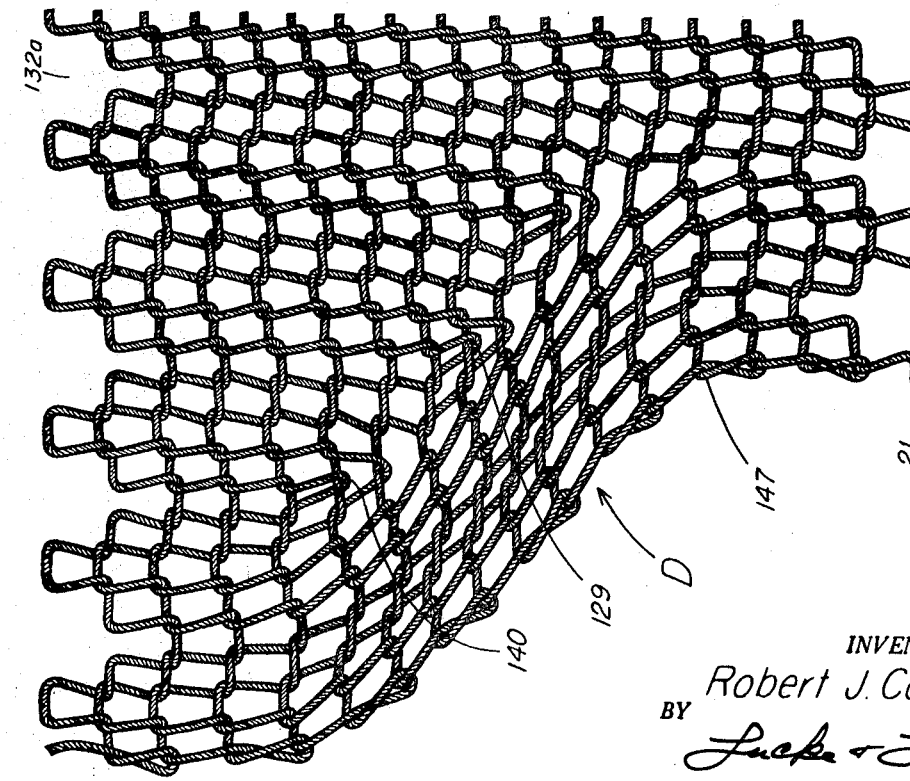

Oct. 27, 1970              R. J. COREY              3,535,891

METHOD OF AND APPARATUS FOR MAKING NON-RUN REVERSIBLE KNIT-WEAVE

Original Filed Nov. 14, 1963              34 Sheets-Sheet 10

INVENTOR.
Robert J. Corey
BY

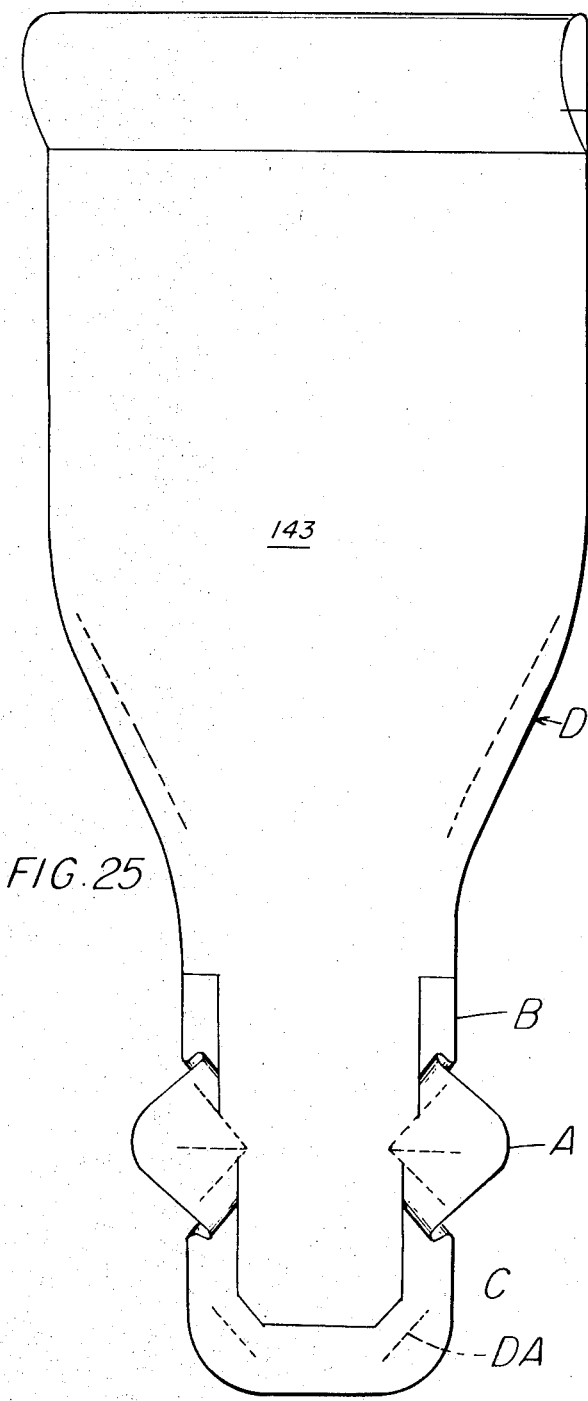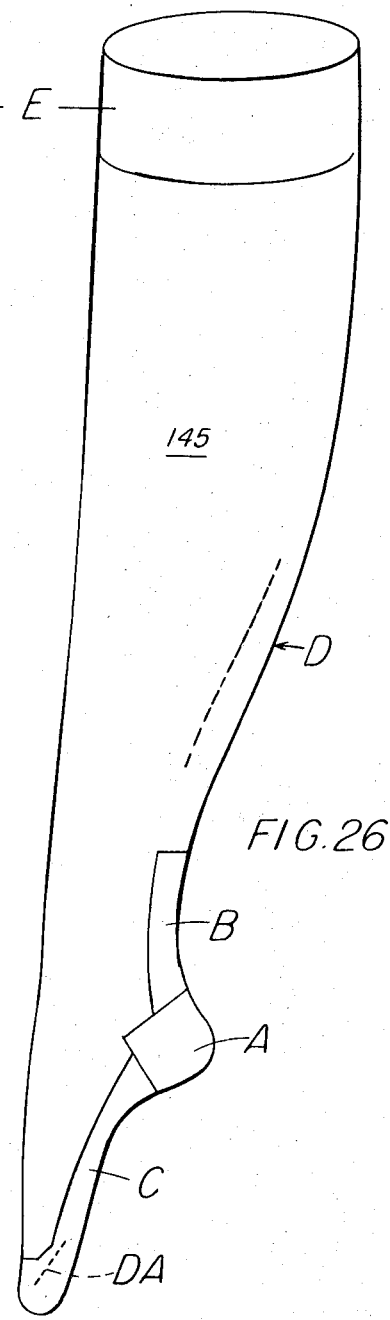

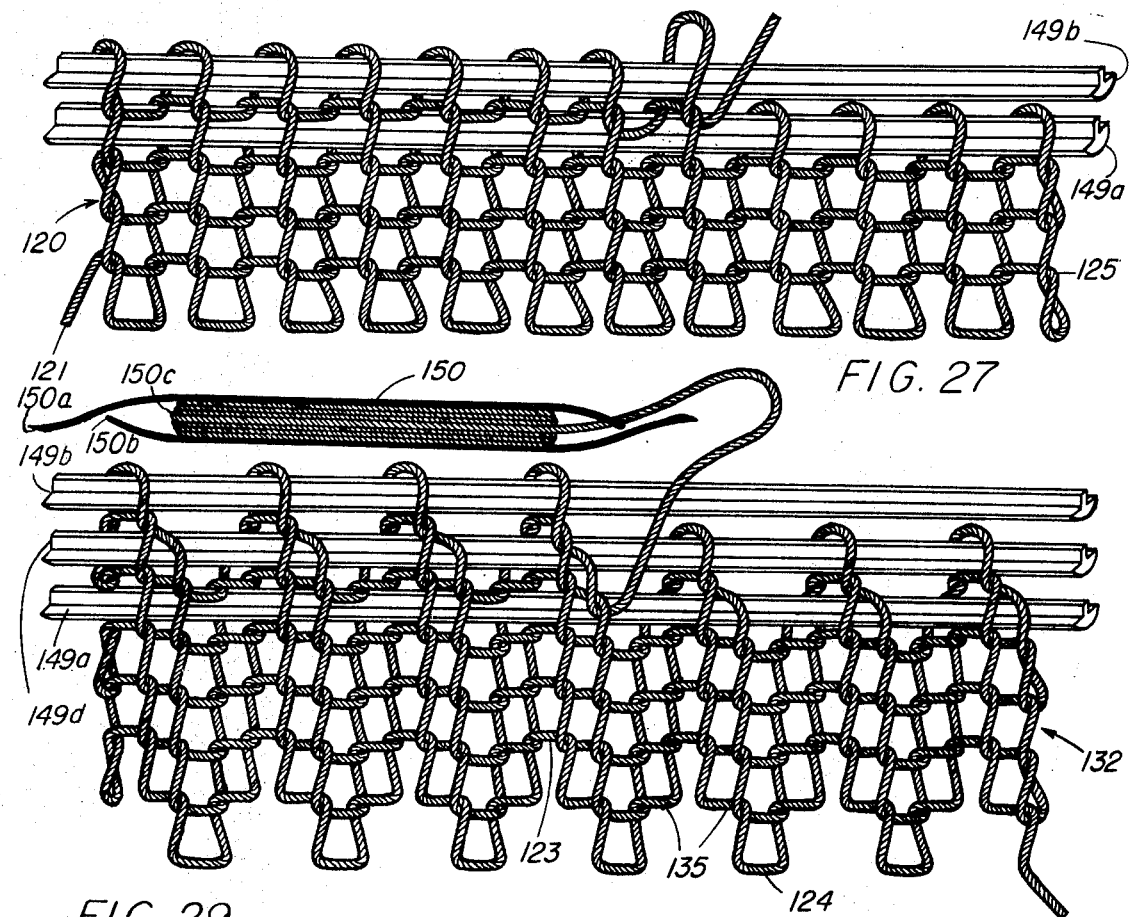
FIG. 27
FIG. 29
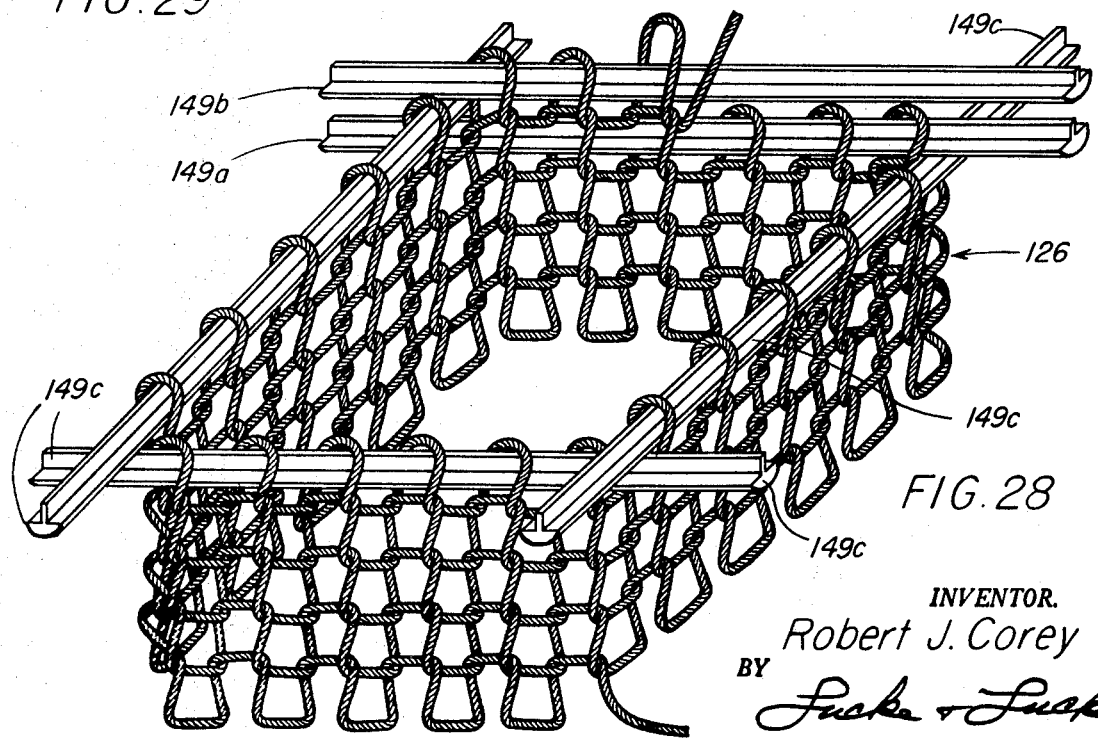
FIG. 28
INVENTOR.
Robert J. Corey
BY
Lucke & Lucke Oct. 27, 1970  R. J. COREY  3,535,891
METHOD OF AND APPARATUS FOR MAKING NON-RUN REVERSIBLE KNIT-WEAVE
Original Filed Nov. 14, 1963  34 Sheets-Sheet 14
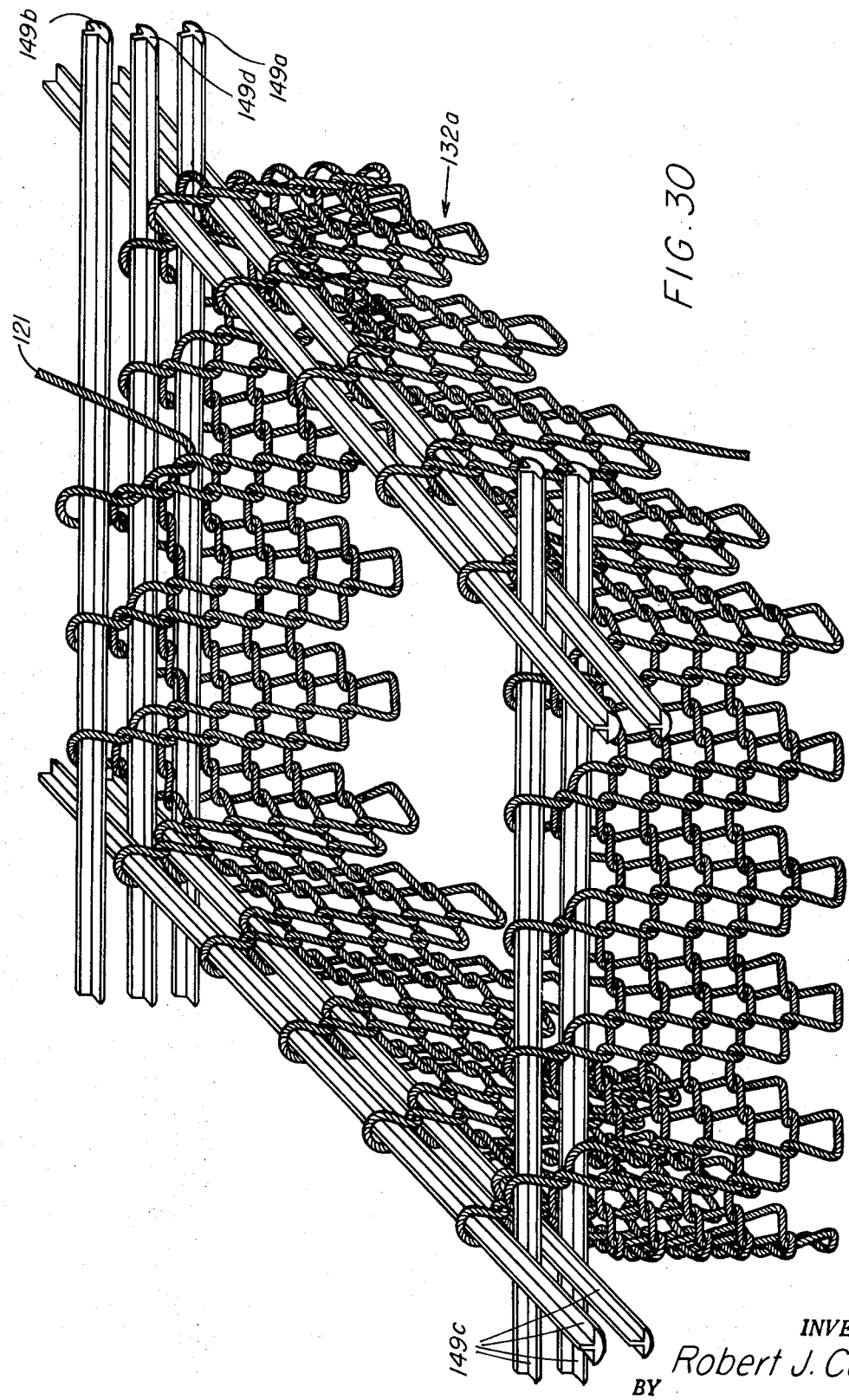
INVENTOR.
Robert J. Corey
BY

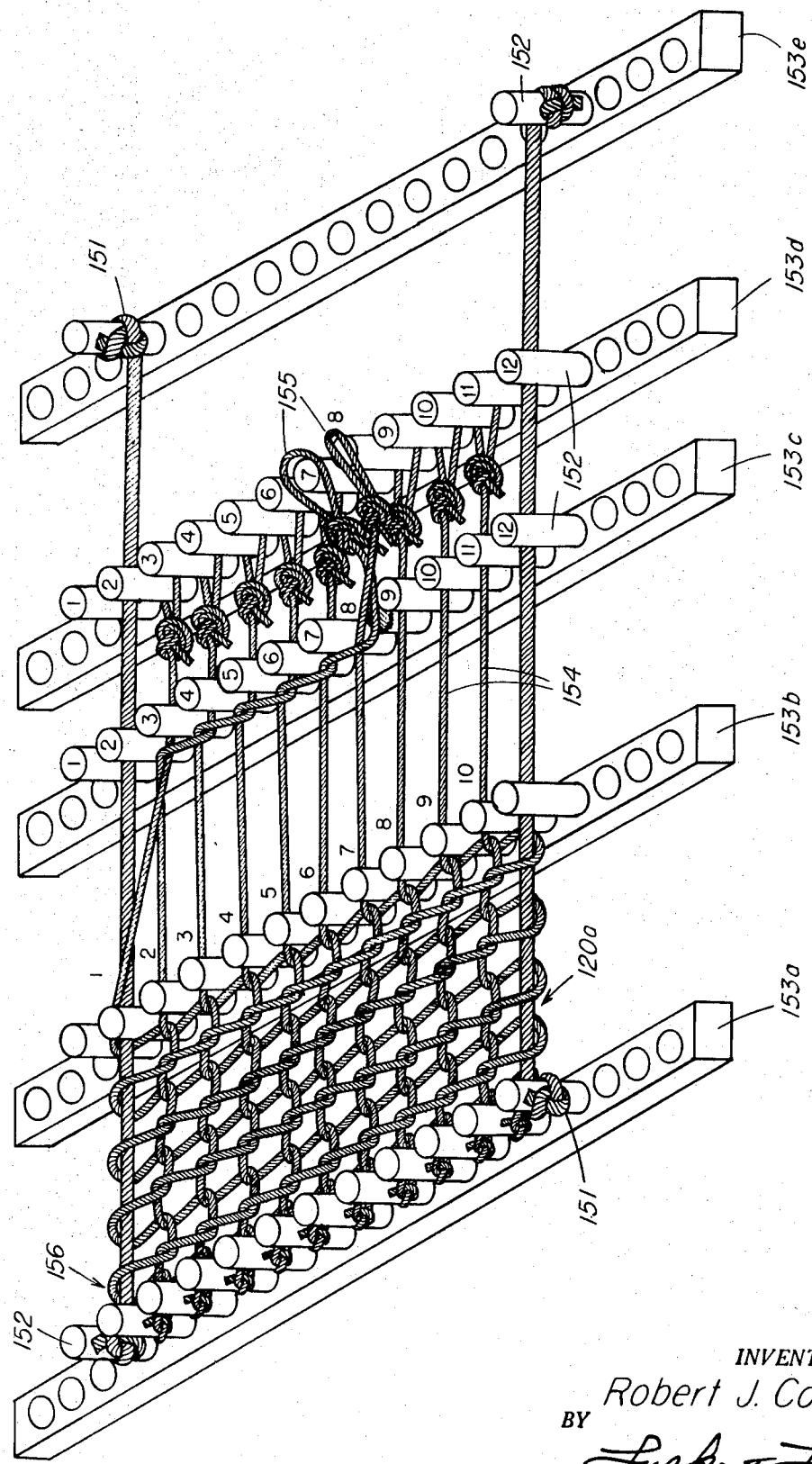

Oct. 27, 1970  R. J. COREY  3,535,891
METHOD OF AND APPARATUS FOR MAKING NON-RUN REVERSIBLE KNIT-WEAVE
Original Filed Nov. 14, 1963  34 Sheets-Sheet 16
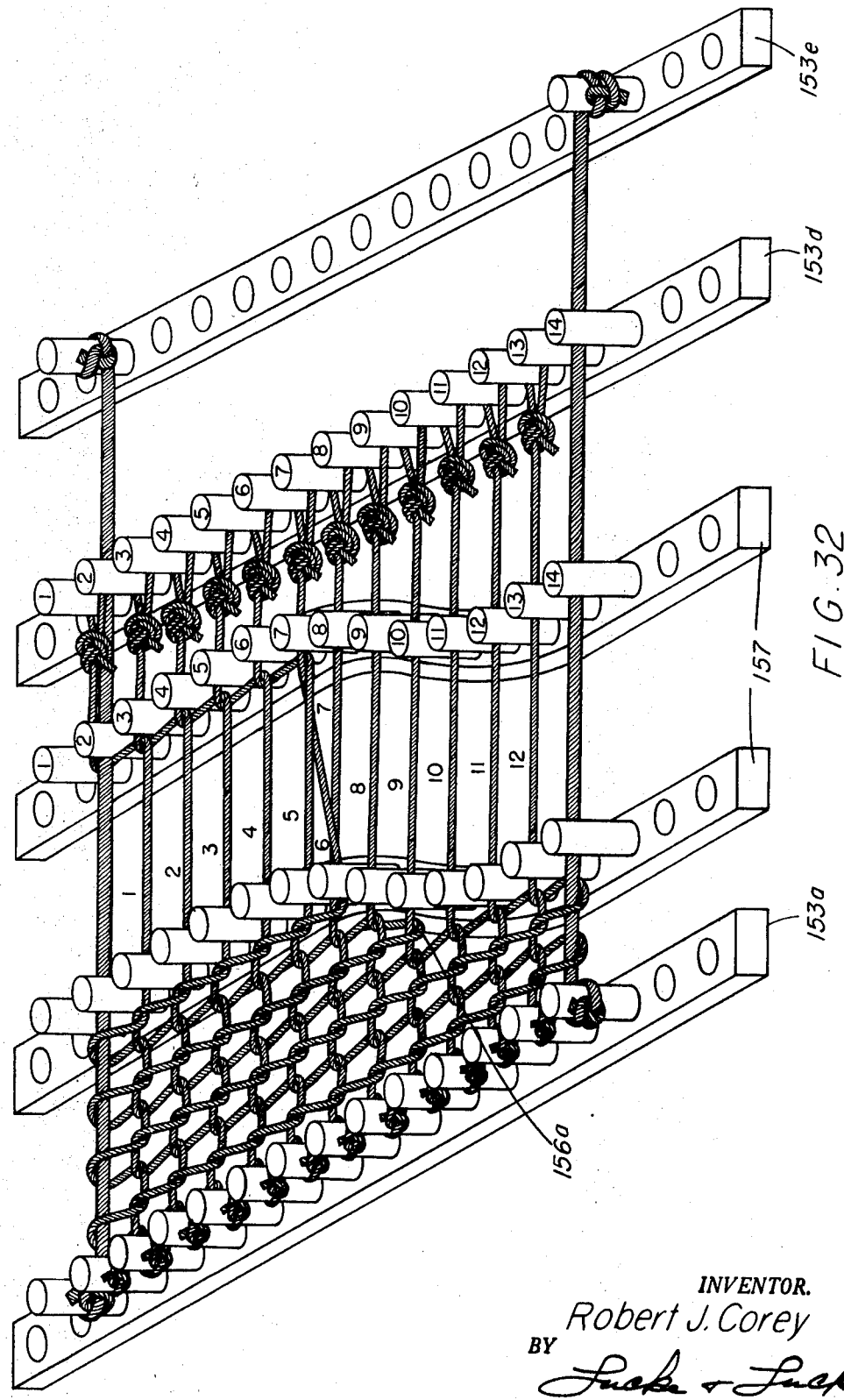
INVENTOR.
Robert J. Corey
BY
Lucke + Lucke

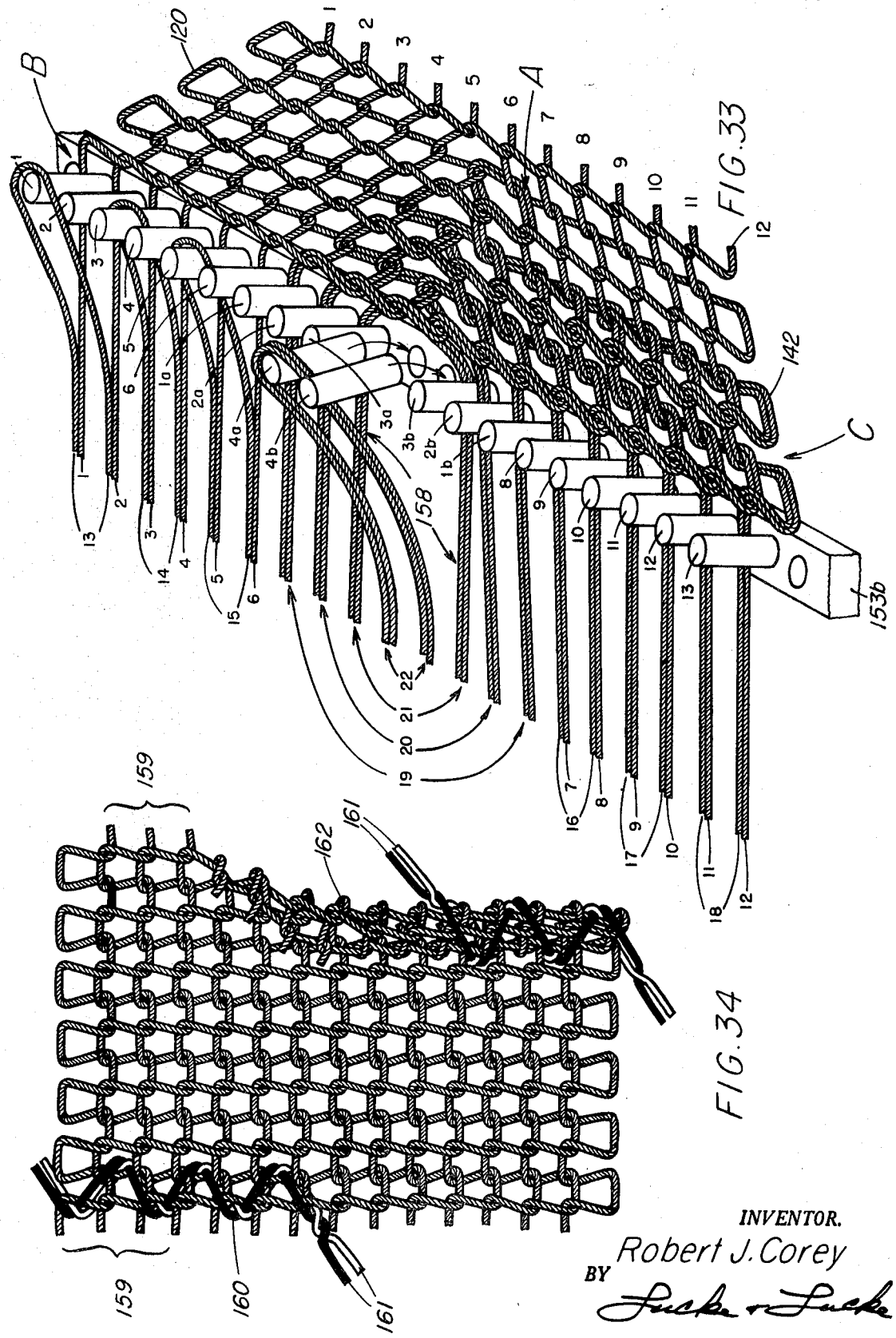

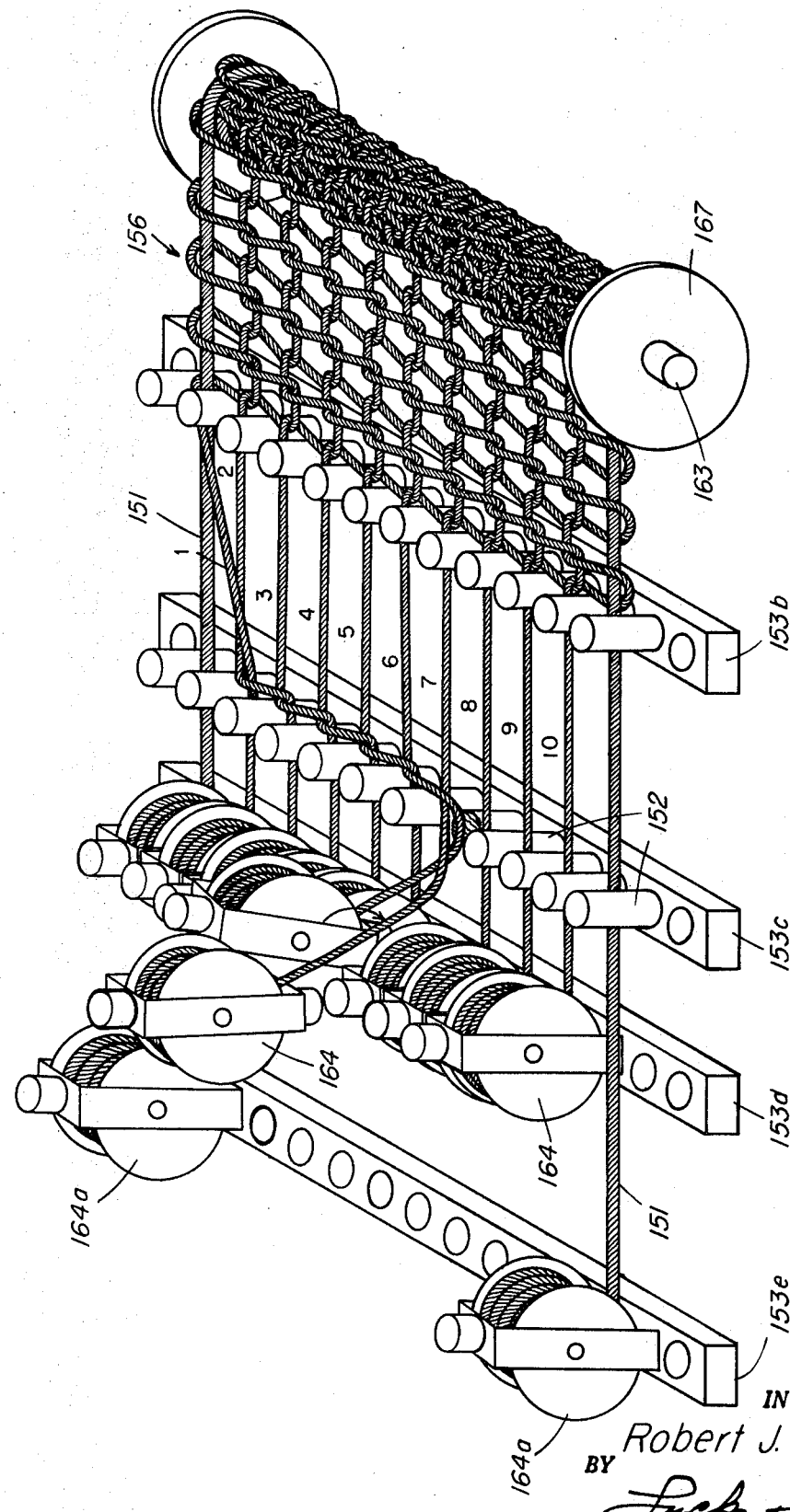

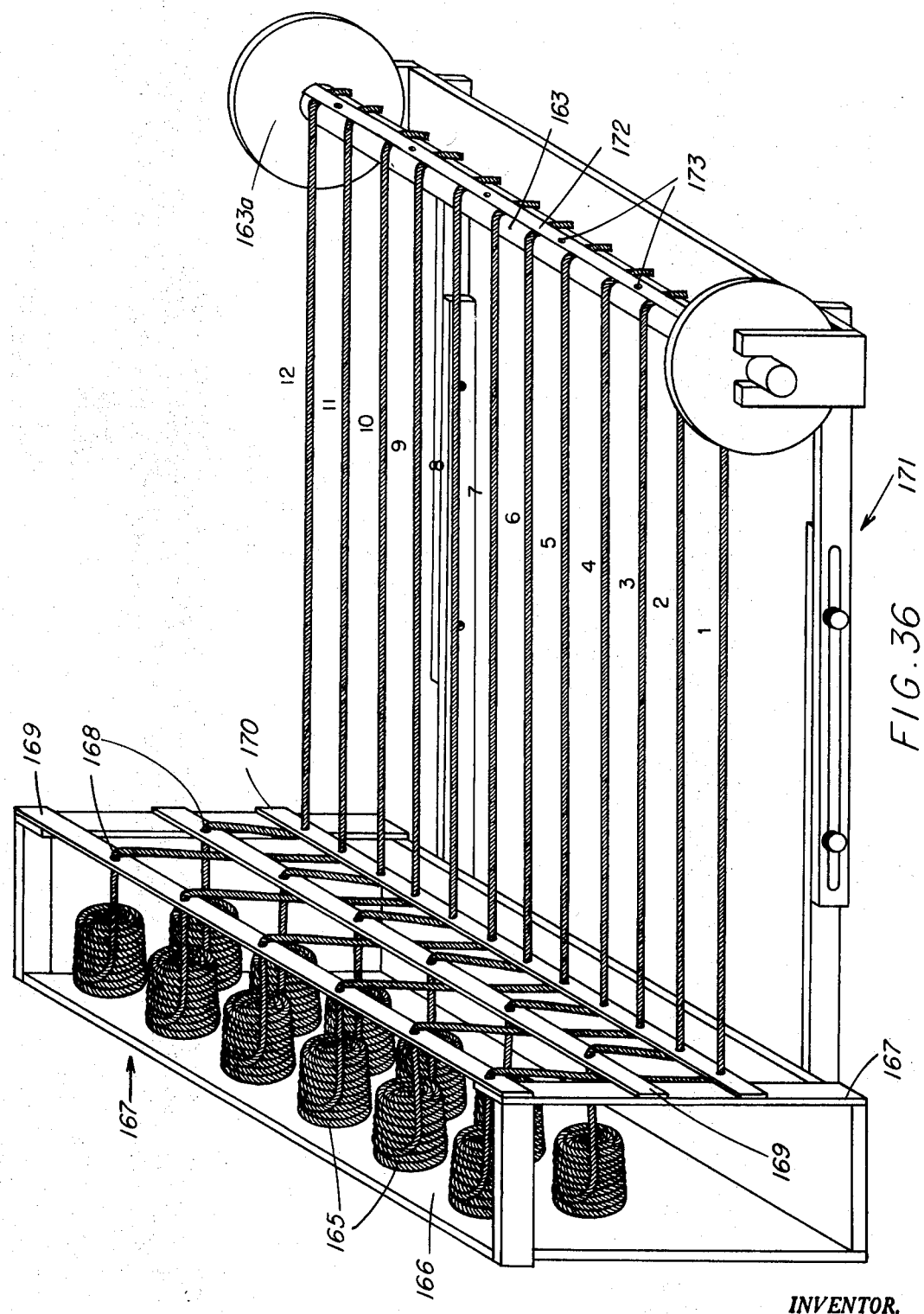

INVENTOR.
Robert J. Corey

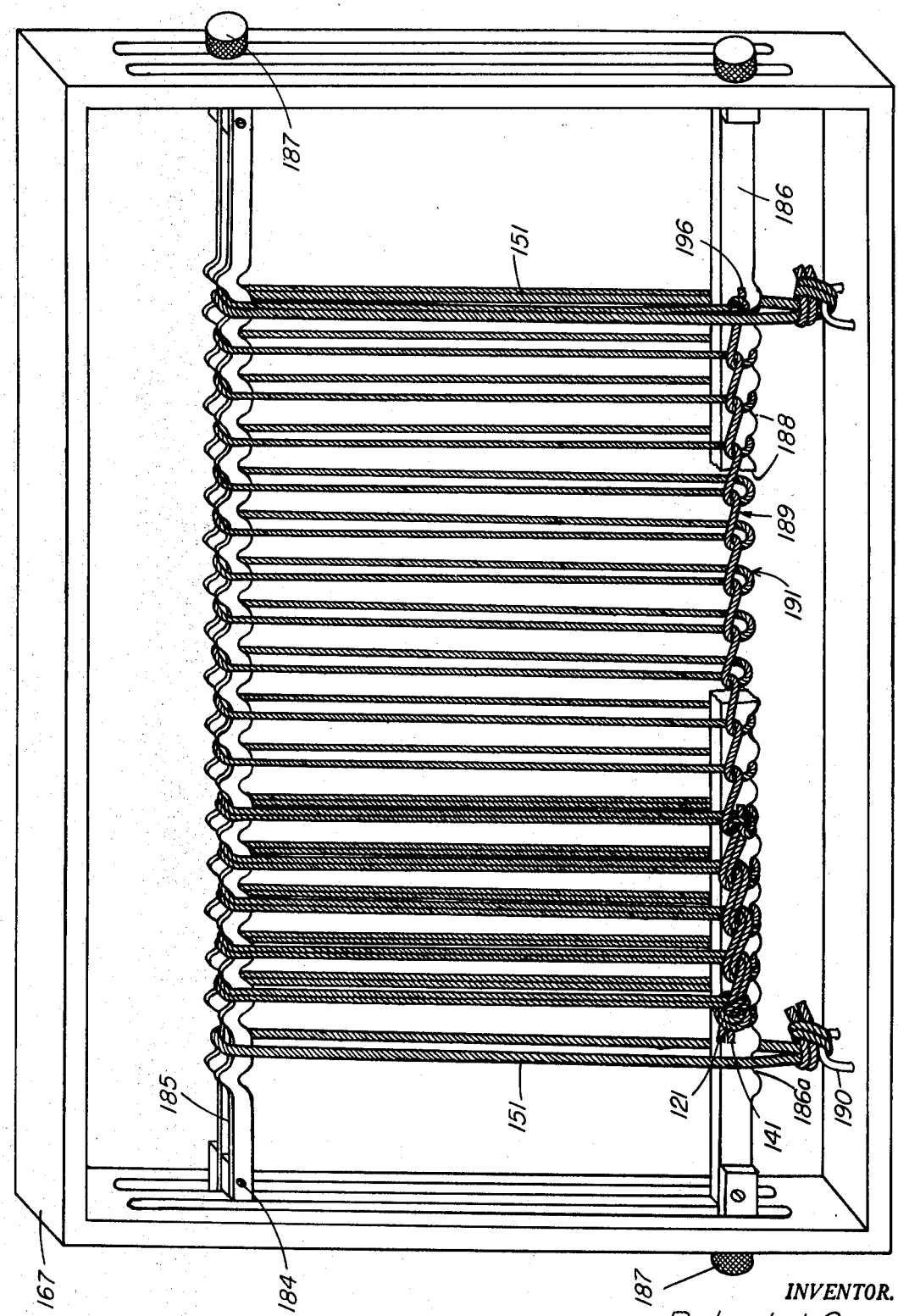

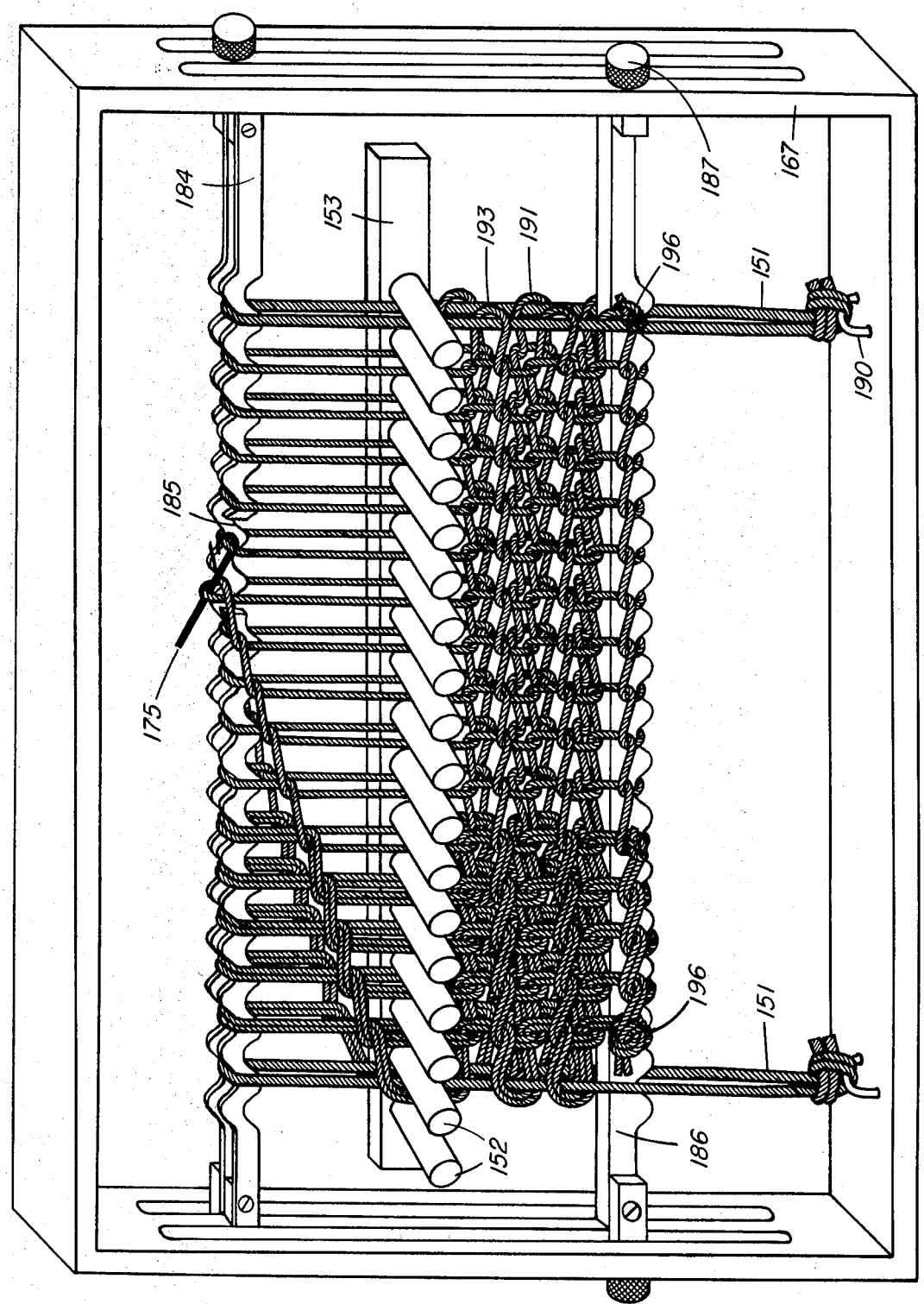

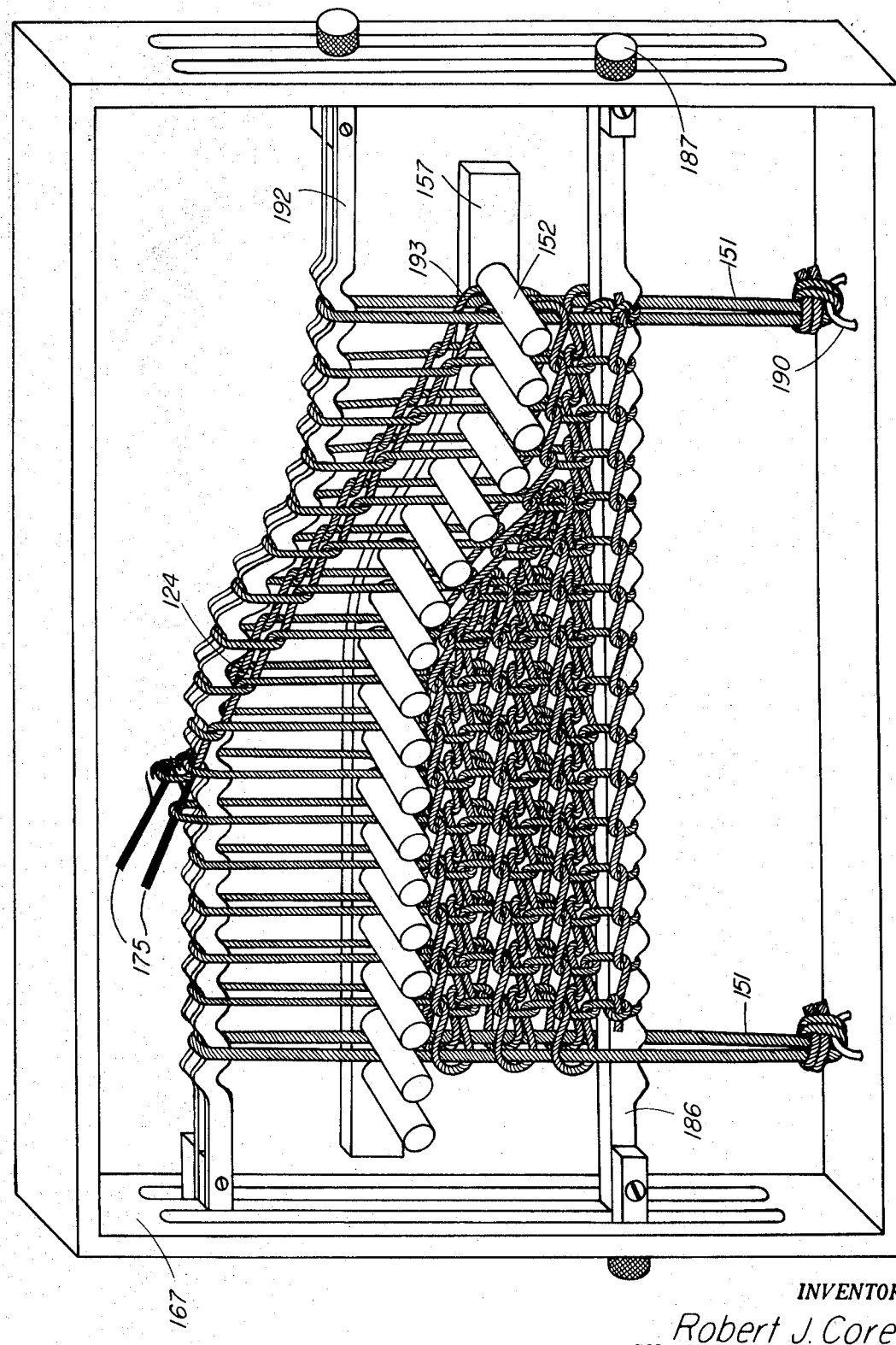

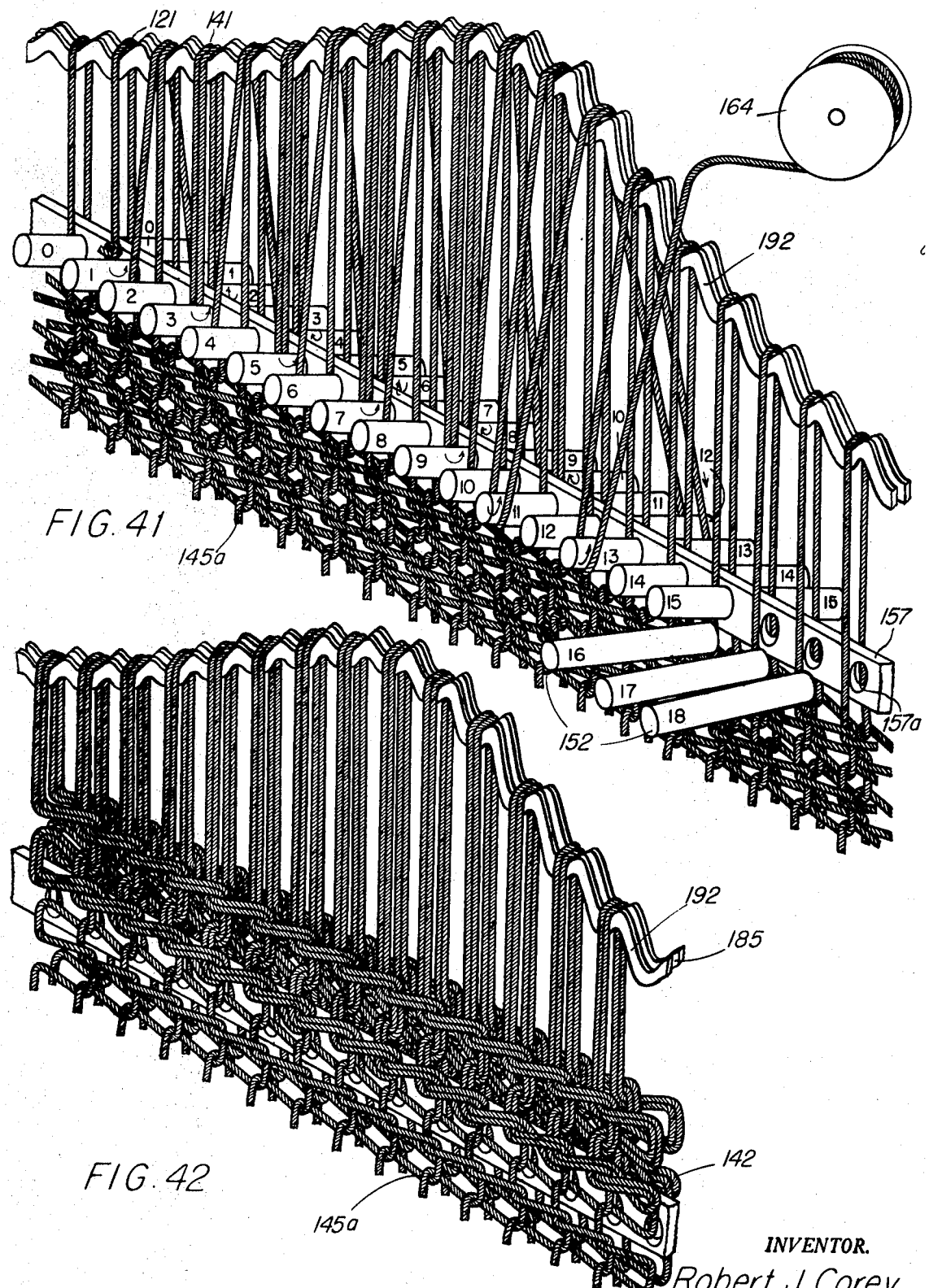

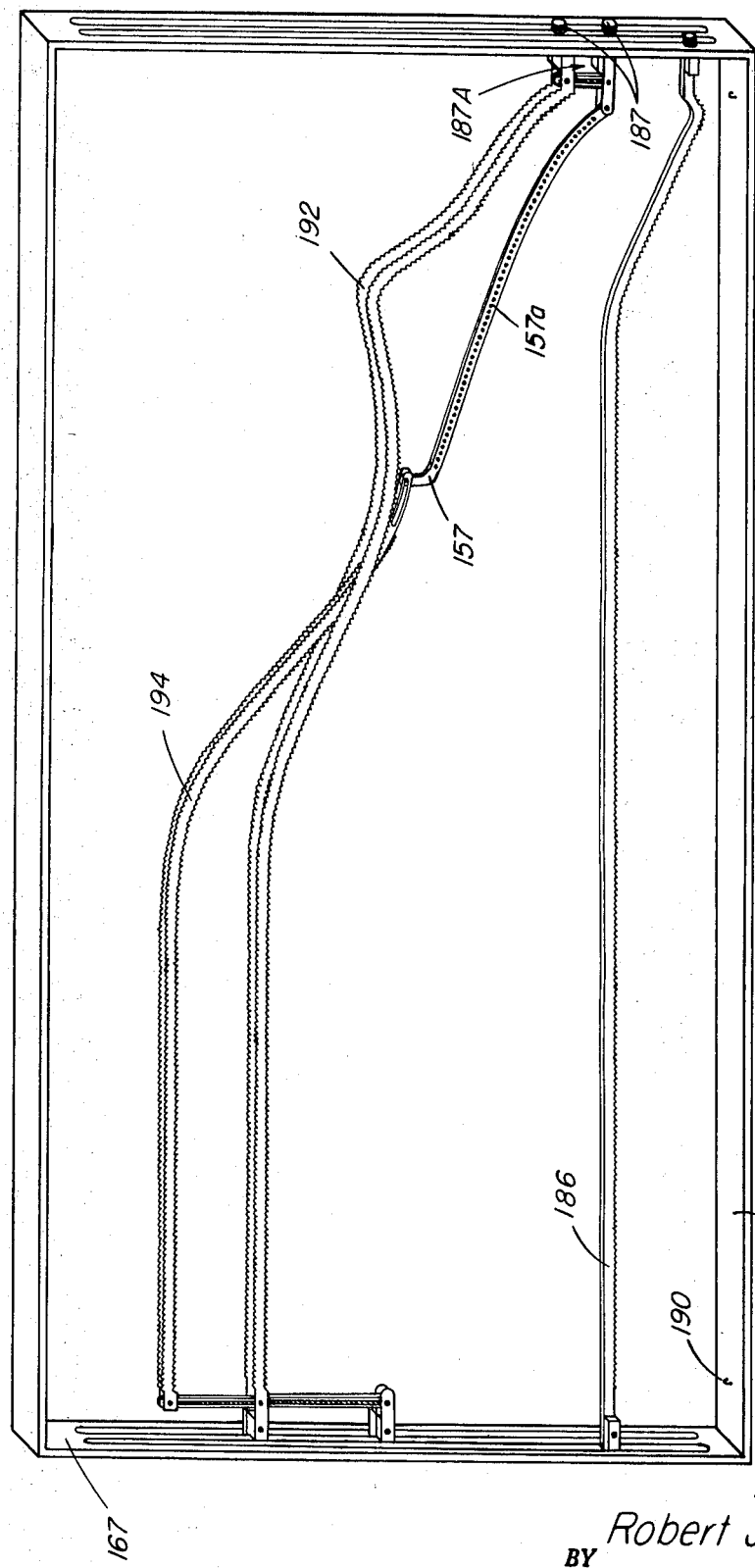

Oct. 27, 1970     R. J. COREY     3,535,891
METHOD OF AND APPARATUS FOR MAKING NON-RUN REVERSIBLE KNIT-WEAVE
Original Filed Nov. 14, 1963     34 Sheets-Sheet 26

INVENTOR.
Robert J. Corey
BY Lucke & Lucke

INVENTOR.
Robert J. Corey

Oct. 27, 1970 R. J. COREY 3,535,891
METHOD OF AND APPARATUS FOR MAKING NON-RUN REVERSIBLE KNIT-WEAVE
Original Filed Nov. 14, 1963 34 Sheets-Sheet 29

INVENTOR.
Robert J. Corey
BY
Lucke & Lucke

INVENTOR.
Robert J. Corey

Oct. 27, 1970 R. J. COREY 3,535,891
METHOD OF AND APPARATUS FOR MAKING NON-RUN REVERSIBLE KNIT-WEAVE
Original Filed Nov. 14, 1963 34 Sheets-Sheet 32

INVENTOR.
Robert J. Corey
BY

United States Patent Office 3,535,891
Patented Oct. 27, 1970

3,535,891
METHOD OF AND APPARATUS FOR MAKING
NON-RUN REVERSIBLE KNIT-WEAVE
Robert J. Corey, Box 588A, Rte. 1,
Dover, N.J. 07801
Original application Nov. 14, 1963, Ser. No. 323,635, now Patent No. 3,342,044, dated Sept. 19, 1967. Divided and this application Sept. 18, 1967, Ser. No. 685,721
Int. Cl. D04b 35/00
U.S. Cl. 66—1
44 Claims

ABSTRACT OF THE DISCLOSURE

This specification discloses methods of horizontally or vertically knit weaving single and/or multiple stretch materials in both flat and tubular form. These materials may be fabricated into various articles of manufacture such as garments including full fashioned seamless and seamed hosiery. These single and multiple stretch materials can be made by hand with elemental bars and a bobbin. The invention also includes a method of converting seamless into seamed hosiery.

Looms having removable bobbins and permanently set combs constitute apparatus for making knit woven flat material. Frames having split bars and displaceable formed and non-formed combs constitute apparatus for making knit woven tubular material and garments, including the simultaneous fabrication of a pair of seamed hose.

---

This application is a division of my copending application, Ser. No. 323,635, filed Nov. 14, 1963, entitled Non-Run Reversible Knit-Weave, now Pat. No. 3,342,044.

BACKGROUND OF THE INVENTION

Field of the invention

This invention relates to the general field of tricot knitted fabrics. It also relates to methods and apparatus for making non-run two-way stretch fabrics.

Description of the prior art

Previously, tricot fabrics and the like have only been made vertically to form knitted fabric having a single degree two-way stretch. The tricot weave, based upon a vertically woven series of looped stitches is vulnerable in the line of stress, being devoid of resistance to two-directional vertical runs when even one stitch is broken.

None of the self-termed "non-run" or "runproof" fabrics known in the art have proven such claimed characteristics in actual use, especially when fabricated into so called "silk" stockings. At best, conventional weaves are only run-resistant.

SUMMARY OF THE INVENTION

This invention relates to methods of and apparatus for vertically knitting and horizontally weaving a non-run, reversible knit woven single stretch material and articles of manufacture made therefrom in flat form. It also relates to methods and apparatus for making this knit woven material and/or garments such as hosiery and the like in tubular form in both single and multiple two-way stretch elasticity. The invention also encompasses methods and means for making multiple stretch knit woven material in flat form; of increasing and decreasing the width of all of the above stated knit woven materials to predetermined shapes and of increasing the number of threads to re-inforce specific areas thereof, such as the toe, sole and heel of a stocking. Methods of seaming full fashioned stockings with a visible blocking stitch and finishing "seamless" stockings with an invisible blocking stitch, on the apparatus heren disclosed, are also integral parts of the invention.

An object of the invention is to devise methods of making fine hosiery by using this improved knit weave.

A further object is to develop means for making these new knit weaves by hand as well as apparatus for making them mechanically.

The features and characteristics of the knit weaves forming this invention, adapted to both flat and tubular construction of reversible fabrics including hosiery, are fully described in my above referred to parent application.

BRIEF DESCRIPTION OF THE DRAWINGS

Further features and advantages of the invention will be apparent in the following detail description and the accompanying drawings which illustrate preferred embodiments of the invention, wherein

FIG. 17 is an enlarged view of a regular stretch woven section showing the method of increase and decrease of single thread stitches which may be used to form the calf and toe portion of a stocking;

FIG. 18 is an enlarged view of a regular stitch woven fabric showing the use of multiple threads for greater support and the manner of increasing and decreasing stitches to form a toe section, only half of which is shown;

FIG. 19 is an enlarged sectional view of a flat woven stocking showing the manner of increasing and decreasing multiple thread stitches to form a sole, ankle and inserted heel support;

FIG. 21 is an enlarged sectional view of a double stretch, single thread stocking with increased stitches to form the calf portion thereof;

FIG. 22 is an opposite sectional view of a weave to that of FIG. 21 showing the manner in which additional threads may be added for local areas requiring increased support;

FIG. 25 is a reduced plan view of a flat woven stocking prior to seaming;

FIG. 26 is a perspective view of a tubular woven stocking;

FIG. 27 is an elevational view of two bars with a single stretch flat material, such as may be used for stockings, being vertically knit woven thereon;

FIG. 28 is a perspective view of five knitting bars illustrating the vertical method of making a single stretch, tubular knit-type woven material such as a stocking thereon;

FIG. 29 is an elevational view of a double stretch, flat material being vertically knit woven over three bars;

FIG. 30 is a perspective view of a double stretch, tubular material such as a stocking being vertically knit woven over a plurality of bars;

FIG. 31 is a perspective view of an apparatus for manually making the horizontal single stretch, knit-type weave in flat form;

FIG. 32 is a perspective view of the apparatus used to increase and decrease a similar weave to that illustrated in FIG. 31 in order to form the calf portion of a stocking or the like;

FIG. 33 is a partial perspective view of a hand knit-woven stocking in the making showing how additional thread is inserted into the basic fabric to form a multiple thread heel support;

FIG. 34 is a plan view of a flat horizontal weave cut and sewn with a zigzag stitch to finish its cut flat edge;

FIG. 35 is a perspective view of the basic apparatus required to manually knit weave a flat fabric directly on a bolt;

FIG. 36 is a perspective view of the basic apparatus for weaving preshaped fabric sections in bolts;

FIG. 38 is a perspective view of a frame with a plurality of straight bars for horizontally knit weaving a tubular fabric;

FIG. 39 is a sequence view to FIG. 38 showing the manner of combing each row of single and multiple thread stitches into place when completed;

FIG. 40 is a perspective view of a frame showing the means and method of increasing and decreasing stitches in order to shape the calf and toe sections of a hand knit woven stocking;

FIG. 41 is a perspective view of a pegged lower bar and split center upper bar showing how multiple threads may be added to a single weave to form ankle, heel and toe supports;

FIG. 42 is a sequence view to FIG. 41 illustrating the method of making a fabric partially woven with multiple threads and the manner of removing pegs or pins from the lower bar;

FIG. 43 is an elevational view of a frame for making a stocking and the like with shape bars positioned to have thread wound thereon as shown in FIG. 38;

Referring now to the drawings, FIG. 1 shows a flat knitted blank of the new weave identified generally as 120. The blank is made from a single thread 121 woven vertically in undetermined length into a first horizontal course 122 of a predetermined number of alternate regular or downwardly facing loops 123 and inverted or upwardly facing loops 124 on a one row step up basis.

A selvage edge 125, which is necessary in all finished flat woven fabrics, is formed on both edges as the single thread knitting proceeds from the first course to each succeeding course 125a. When the second course of identical loops are woven, the thread moves horizontally in the opposite direction to that of the first or preceding course and in so doing is twisted or intertwined under the first leg and over the second leg of the loop immediately below it to positively interlock both ends or corners of the bight portion of each regular loop 123. A cheaper, faster weave can also be produced with a raw edge hereinafter described, for articles to be made from sewn, cut fabric.

Figure 1:
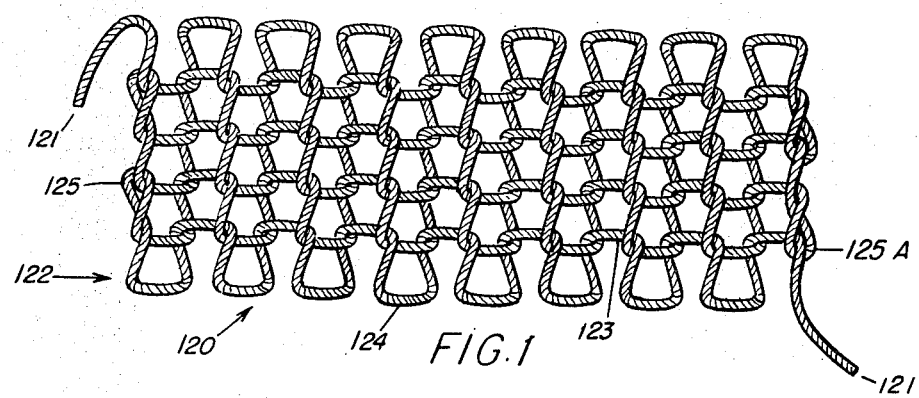
FIG. 1 is an enlarged view of a section of a novel fabric in flat form made in accordance with the invention and illustrates a new type of vertically knit woven stitches, made one stitch at a time and the manner of interlocking one course of such stitches with each preceding course.
Figure 2:
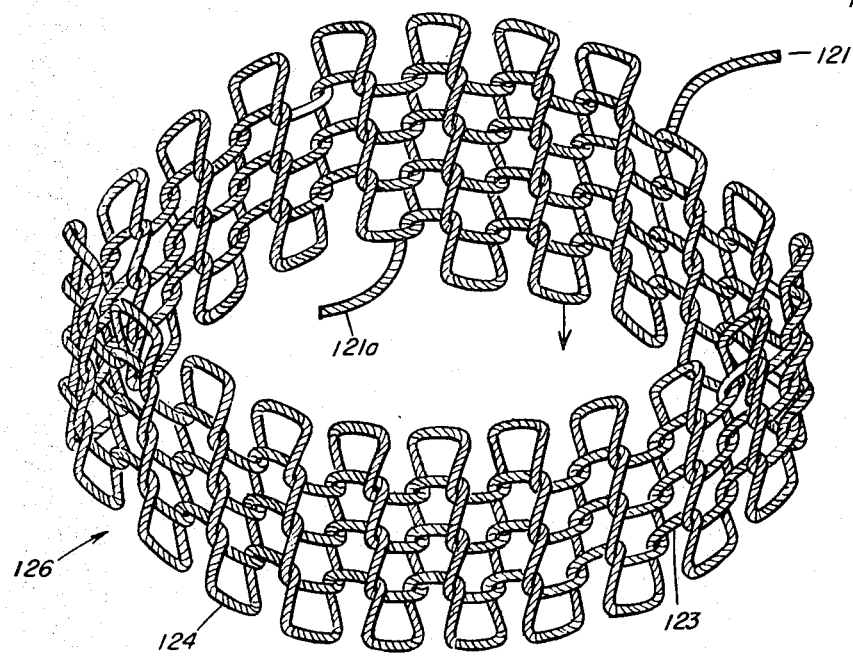
FIG. 2 is an enlarged view of a section of the same type of fabric shown in FIG. 1, but made one stitch at a time in tubular form such as used to make full fashioned hose.

This new weave which has the same elastic characteristics as tricot both lengthwise and sidewise is capable of being woven in tubular form as required in the manufacture of full fashioned knit hose. The tubular section illustrated in FIG. 2 is generally designated 126 and is made by weaving one thread 121a in continuous circles, the dimensions of which may remain constant, diminish or increase to conform to any desired pattern.

Figure 5:
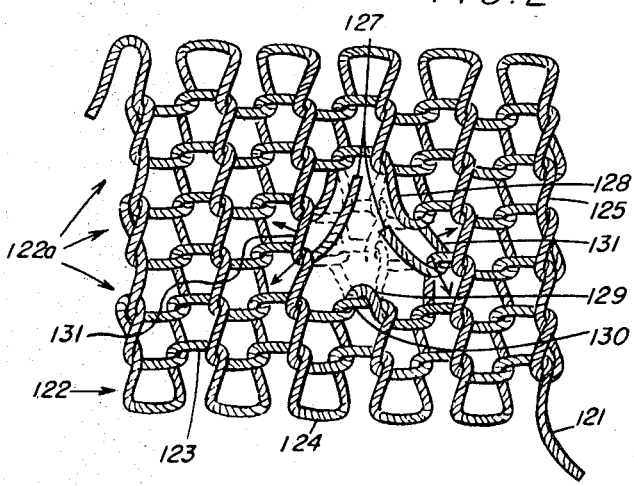
FIG. 5 is a sequence view similar to that of FIGS. 3 and 4. In this view, the ends of the broken loop have escaped from the initial vertical clamping action only to be subjected to a further and more positive vise effected by the lateral pull of adjacent loops in its respective horizontal course. The tightening action shown on the right is a subsequent phase to that shown on the left and is the final stage of a broken thread end.
Figure 8:
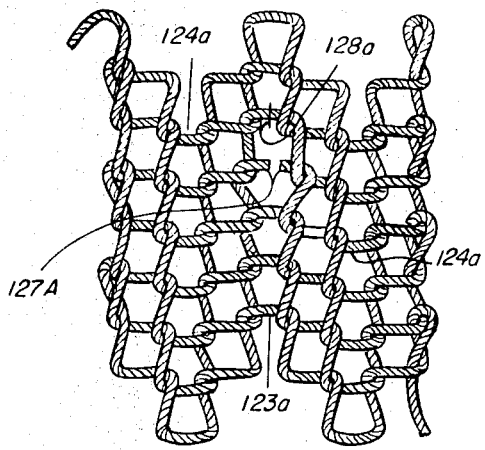
FIG. 8 is an enlarged view of a flat woven section such as shown in FIG. 6 and is the first in a series of figures illustrating the result of breaking a loop in a wale of this interlocked weave.
Figure 9:
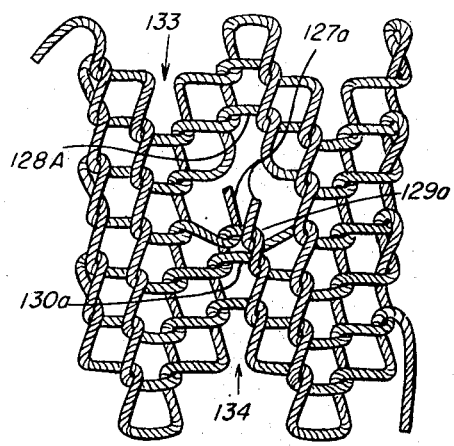
FIG. 9 is a sequence view similar to that of FIG. 8 and shows the ends of the broken thread separated from the horizontal loop directly above it and being drawn together by the horizontal loop directly below it.
Figure 11:
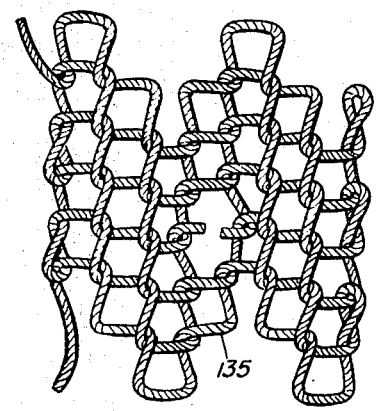
FIG. 11 is an enlarged view of a flat woven section similar to that shown in FIG. 6, but having a thread broken in one of the intermediate columns adjacent the separated wales of the modified weave.
Figure 12:
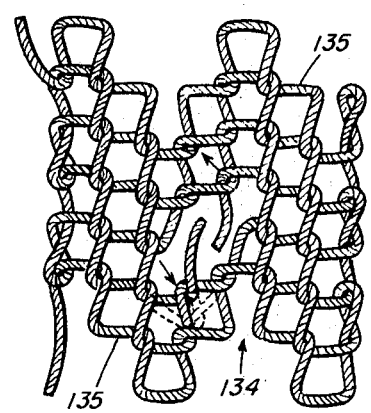
FIG. 12 is a sequence view to that of FIG. 11 showing the initial stage of loop separation before each broken end is clamped by lateral pull of the horizontal interlocked loops in opposite directions. The lower dotted broken thread is shown pulled tight in finally locked position.
Figure 3:
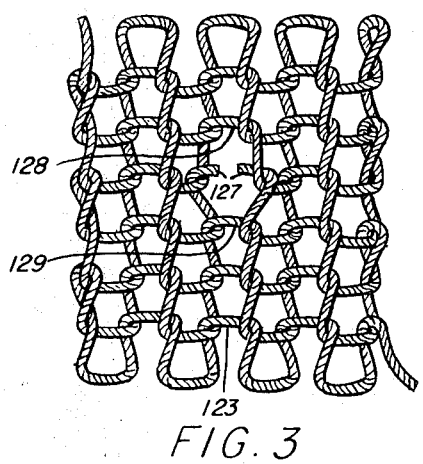
FIG. 3 is an enlarged view of a flat woven section such as shown in FIG. 1 and is the first in a series of figures illustrating the self-adjusting steps which occur when an interlocked loop is broken.
Figure 4:
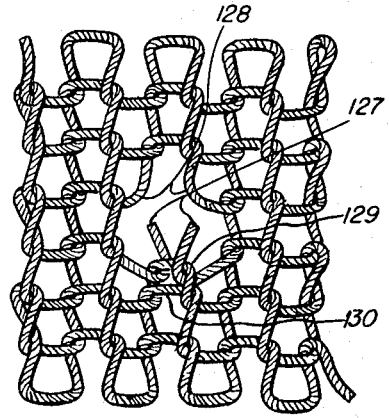
FIG. 4 is a sequence view similar to that of FIG. 3 and shows the ends of the broken thread, separated from the horizontal loop directly above it, being initially clamped between the next two horizontal loops directly beneath it, thus preventing a run from starting.

FIGS. 3 to 5 illustrate the manner in which components of the knit weave, whether in flat or tubular form, automatically adjust structurally from original loop formation to an inter-locked clamping position to prevent runs.

In FIG. 3 a regular loop or stitch 123 has been severed to form two broken ends 127. Normal lateral tension will pull the two separate ends from the upper vertically interlocked loop 128. This loop, which is directly above, remains intact in its horizontally woven course as clearly shown in FIGS. 4 and 5.

In FIG. 4 the broken ends 127, 127 are initially caught by loop 129, directly below the broken stitch, as it is pulled downwardly to overlap the next lower stitch 130. Both stitches 129 and 130 remain intact and no amount of vertical stress or strain could possibly cause a run in a column or wale containing a break or tear such as is indicated by severed stitch 127.

FIG. 5 indicates the steps preceding final clamping of the severed ends. Each end is shown in the process of being locked in its next adjacent horizontal loop when such loops 131, 131 are pulled laterally in a direction away from the break. The ends 127, 127 will remain in a final tightly locked position to restrict the break to an area within its immediately surrounding unbroken loops. The position of stitch 130 shows how the column in which the break occurred is blocked from running in a downward direction, and that of stitch 128 shows how the same column is blocked from running in an upward direction.

Figure 6:
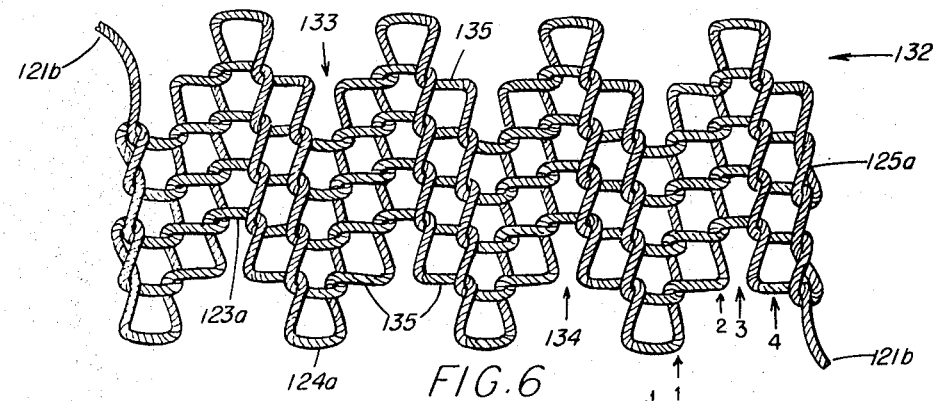
FIG. 6 is an enlarged view of a section of a modification of the novel fabric shown in FIG. 1 in which the same inter-locking principal is used on deeper courses of vertically woven loops to double the degree of two-way elasticity obtainable in the basic weave.

A modified weave having the physical characteristics of twice the degree of elasticity of the basic weave above described, and of conventional tricot weaves, is shown in FIG. 6 and designated generally as 132. This section of fabric is shown knit woven in flat form with a single thread 121b, similar selvage edges 125a, regular loops 123a and inverted loops 124a. This modified weave, however, is a four column weave which forms a series of alternate upright and inverted funnel shaped units, designated 133, 134 respectively. This doubly elastic weave is thus made on a two row step up and two row step down basis, repeating after two steps up and two down, with an intermediate column of square shaped stitches 135 between each wale of regular or inverted loops 123a, 124a respectively.

Figure 7:
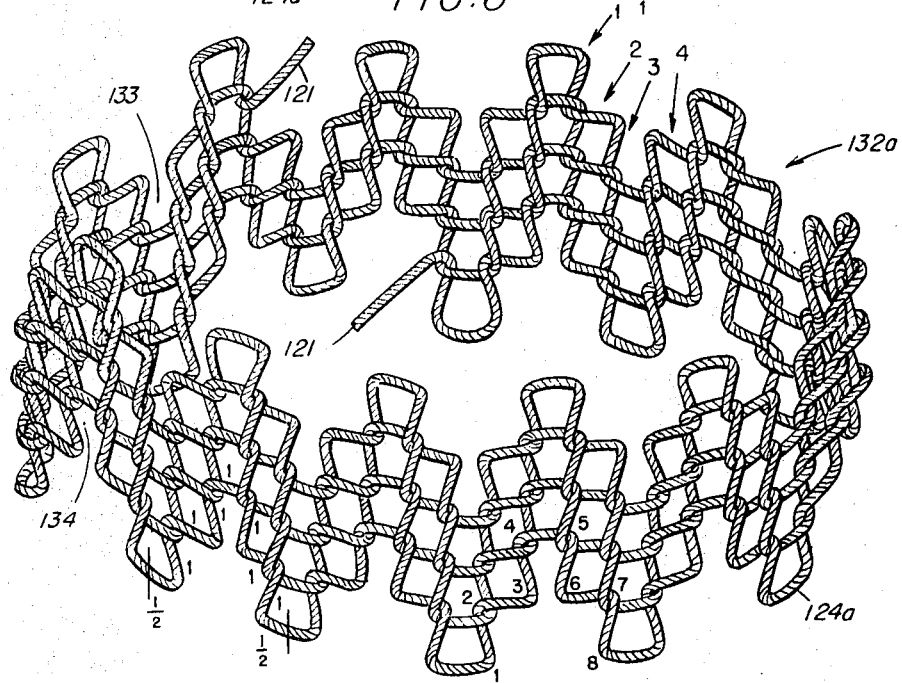
FIG. 7 is an enlarged view of a section of the modified fabric shown in FIG. 6, but made in tubular form.
Figure 10:
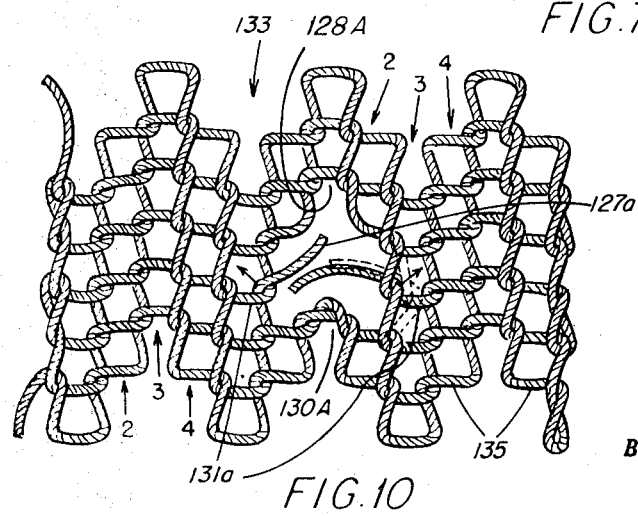
FIG. 10 is a sequence view to those of FIGS. 8 and 9 and shows the impossibility of causing a vertical run in modified as well as the basic weave even if both ends of the broken stitch slip through the tightened loop immediately below. The left-hand broken thread is shown in an intermediate stage which precedes that of the right-hand broken thread shown in the final locked position, see dotted line.

FIG. 7 shows the same modified weave of FIG. 6, but made in tubular form. Like the basic two column weave shown in FIG. 2, this fabric may be woven into uniform, diminishing or increasing annular dimensions, as will be hereinafter shown. These eight cornered units 133, 134 repeat after eight distances and eight corners, as shown in the lower right hand portion of FIG. 7.

FIGS. 13 to 16 illustrate knit weave patterns having greater elasticity than the single and double stretch previously shown. Any degree of stretch desired may be obtained by progressively following the same process of increasing the number of step up and step down loops to that shown in FIGS. 6 to 12.

Figure 13:
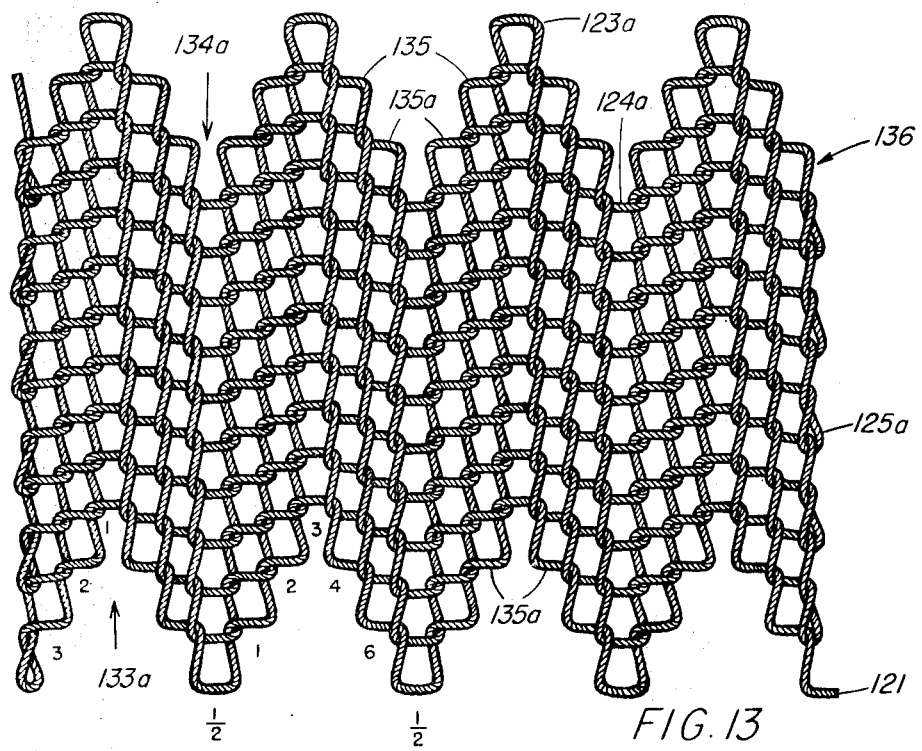
FIG. 13 is an enlarged view of a flat vertically woven section illustrating the same interlocking principal used on three courses of horizontal loops to triple the degree of the basic one course two-way elasticity.
Figure 14:
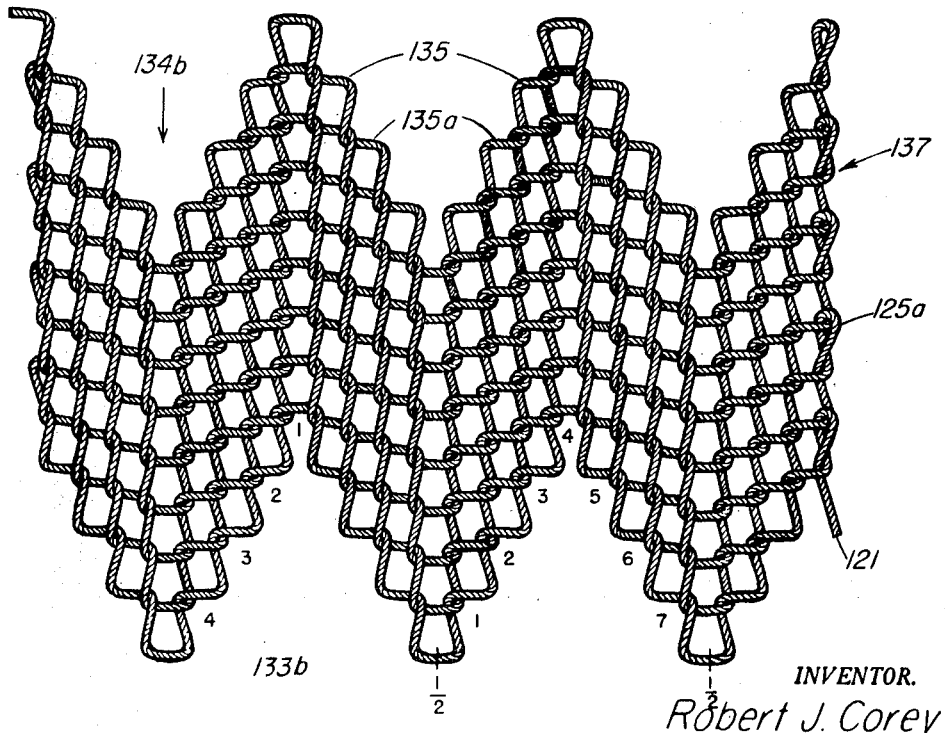
FIG. 14 is a similar view to that of FIG. 13, but showing the knit weave used on four courses of horizontal loops to quadruple the basic two-way elasticity.

It will be noted that the number of columns are increased by two each time the elasticity of the weave is increased one degree, see column 135a in FIG. 13, but that regardless of the degree of elasticity, which could theoretically extend indefinitely, all variations of the modified weave form a series of alternate upright and inverted funnel shaped units, designated 133a–d, respectively.

Thus the triple stretch weave 136 shown in FIG. 13 is woven in a three step up pattern which requires six columns (five whole columns with one-half of a column on each end) to complete each funnel formation 133a, 134a. The quadruple stretch 137 of FIG. 14 made in a four step up, four step down pattern, requires eight columns to complete each cycle, i.e., each 133b or 134b funnel.

Figure 15:
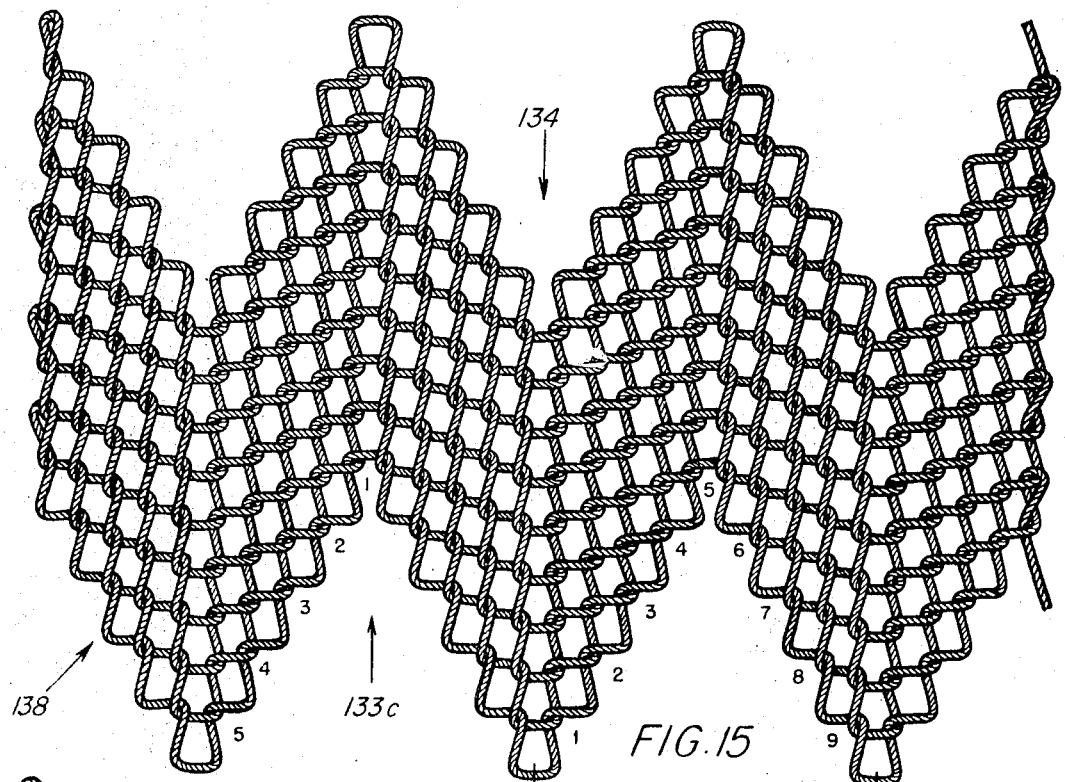
FIG. 15 is a similar view to FIGS. 6, 13 and 14, but illustrating a quintuple two-way stretch knit weave pattern which is five times more elastic than the basic weave of FIG. 1.
Figure 16:
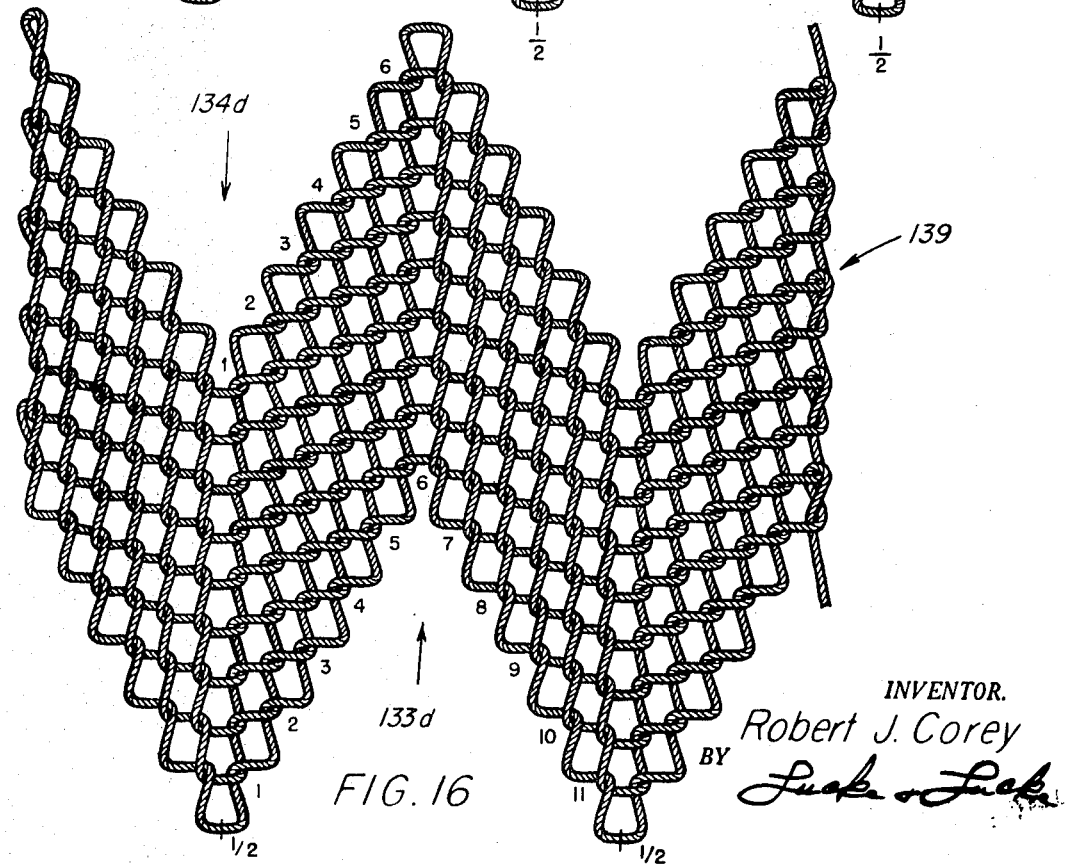
FIG. 16 also is a similar view to the immediately preceding figure, but illustrating a sextuple two-way stretch flat section woven by interlocking six courses of horizontal loops according to the basic principal.

The quintuple stretch fabric 138 is made in a five step up, five step down pattern which takes ten columns to complete each 133c or 134c funnel before the cycle is repeated, as shown in the lower right hand side of FIG. 15. Following the same principle of weaving, sextuple stretch fabric 139 is made on a six step up, six step down basis as indicated in the upper left hand section of FIG. 16. It will be noted from the lower portion of this highly elastic fabric, each funnel formation, 133d or 134d consists of twelve columns.

As seen from the drawings, the basic and modified weaves illustrated therein are reversible, that is to say, each retains its particular pattern or design regardless of whether or not the fabric is turned from top to bottom or upside down. This important feature greatly enhances the value of the material, increasing the ease with which it may be fabricated and worn.

Having illustrated and described the basic knit weave pattern in flat and tubular form and the general type of patterns obtained by increasing its elasticity, it will now be shown how individual rows of the fabric may be increased or decreased to form any desired shape or configuration. Since a principal use of the invention is expected to be in the manufacture of stockings and other types of hosiery, further phases and examples of the invention are shown and described relative to such articles of manufacture.

The piece of single stretch fabric 120 shown in FIG. 17 has been increased from a bottom row of seven oppositely directed columns of loops, 123, 124 to a top row of thirteen such loops. The amount of increase will depend upon the size and shape of the article to be produced. Starting with the fourth row from the bottom and in a series of every other row thereafter, an extra loop 140 is pulled through loop 129 immediately beneath it in the preceding row to form a progressive two stitch increase. A progressive two stitch decrease is obtained by the opposite method or reverse operation as will be apparent from turning this figure upside down. These methods of increasing and decreasing stitches can of course be used whenever applicable, such as to form the calf or toe of a stocking.

FIG. 18 shows the method used to add one or more threads 141 to the original basic thread 121 to obtain increased strength for sections subject to hard wear such as the toe, sole and heel of a stocking. This figure also illustrates the similarity of increasing and decreasing a multiple thread section 142 to one of single thread 120. Although only one additional loop 140 is here shown in each alternate row, it is understood that any desired number of new loops in each row may be formed by the same process.

The method of vertically making a flat stocking is illustrated in FIG. 19. The stocking is woven throughout with a single basic thread 121. To this is added a multiple thread 141 which reinforces the ankle portion B and sole portion C. An inner selvage 125a is formed where the reinforced portions end. The heel section A is woven into the reinforced body portion by means of one or more additional threads 144 creating an inserted triangular heel section. It will be seen from FIGS. 1, 17–19, etc. that vertically knit garments are made from bottom to top.

Figure 20:
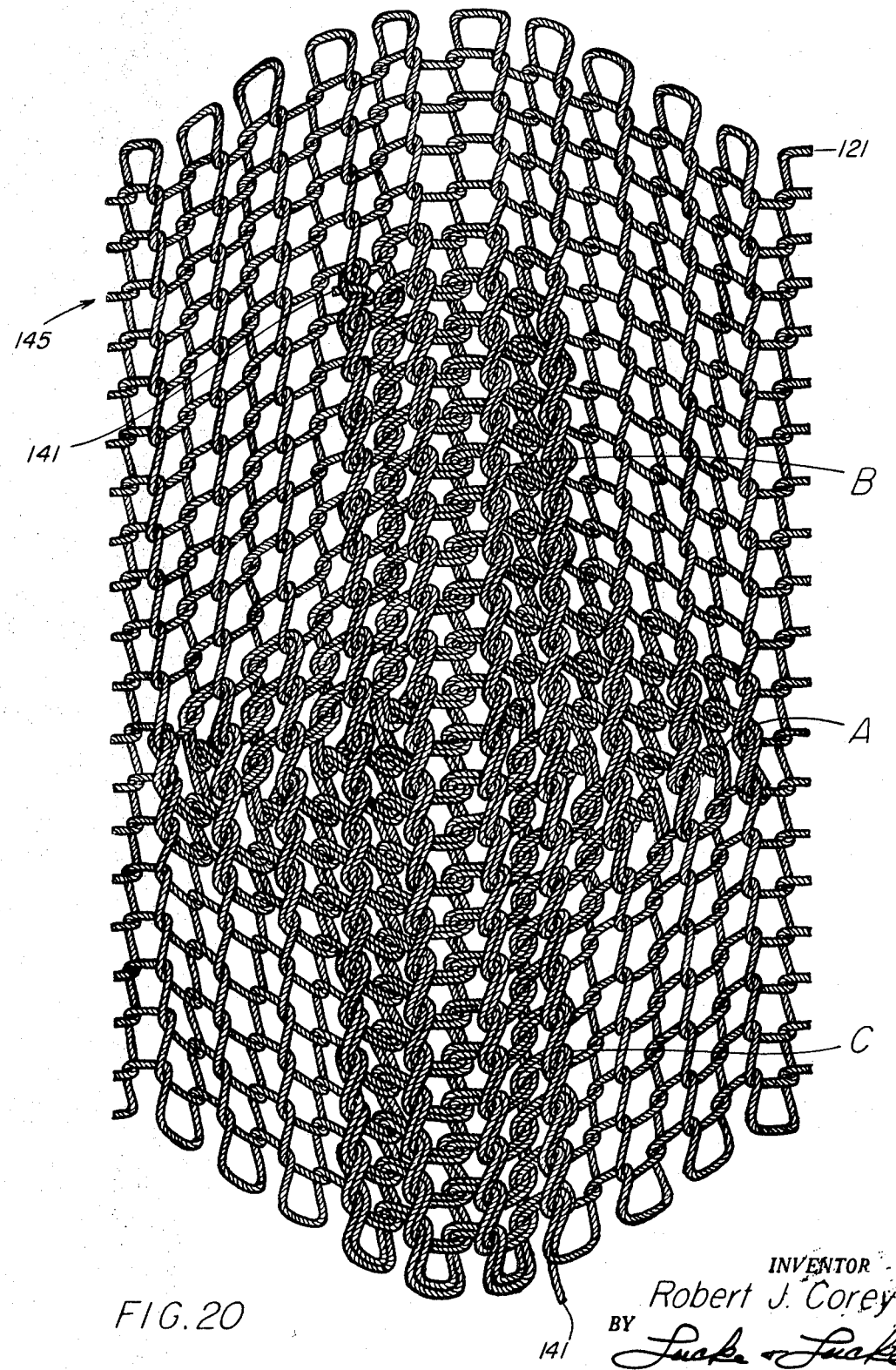
FIG. 20 is an enlarged sectional view of a tubular woven stocking showing the method of forming the sole, ankle and inserted heel support.

The method of forming integral heel, sole and angle portions designated A, B, C, respectively, by introducing an additional thread or threads 141 to a single stretch tubular woven stocking 145 is illustrated in FIG. 20. Multiple threads 141 not only cooperate with basic thread 121 to reinforce the sole and angle portions B and C, but also form the cupped heel portion A into the substantially diamond shaped separation provided therefor. This is merely an example, however, since only twenty eight rows are shown in the center and twenty rows on the edges, whereas in actual practice there would be hundreds of rows in a stocking fabric.

FIGS. 21 and 22 illustrate the method of increasing and decreasing double stretch woven fabric 132a to form the calf portion D or toe portion DA of a stocking or wherever applicable. A single thread double stretch woven stocking 147 is shown in FIG. 21. FIG. 22 shows the opposite view of a similar fabric in which multiple threads (here shown as single thread 141 for ease of illustration) have been introduced to fortify the toe portion thereof.

An increase in the number of stitches is obtained by pulling an extra loop 140 through a lower loop 129 in the preceding row. Conversely, a decrease in the number of stitches is effected by pulling two loops together into one loop from the preceding row. As in FIGS. 17 and 18, the method of decreasing the stitches may be readily discerned by turning FIGS. 21 and 22 upside down. Every increased double stretch stitch adds four columns to the weave and every increased single stretch stitch adds two additional columns.

Figure 23:
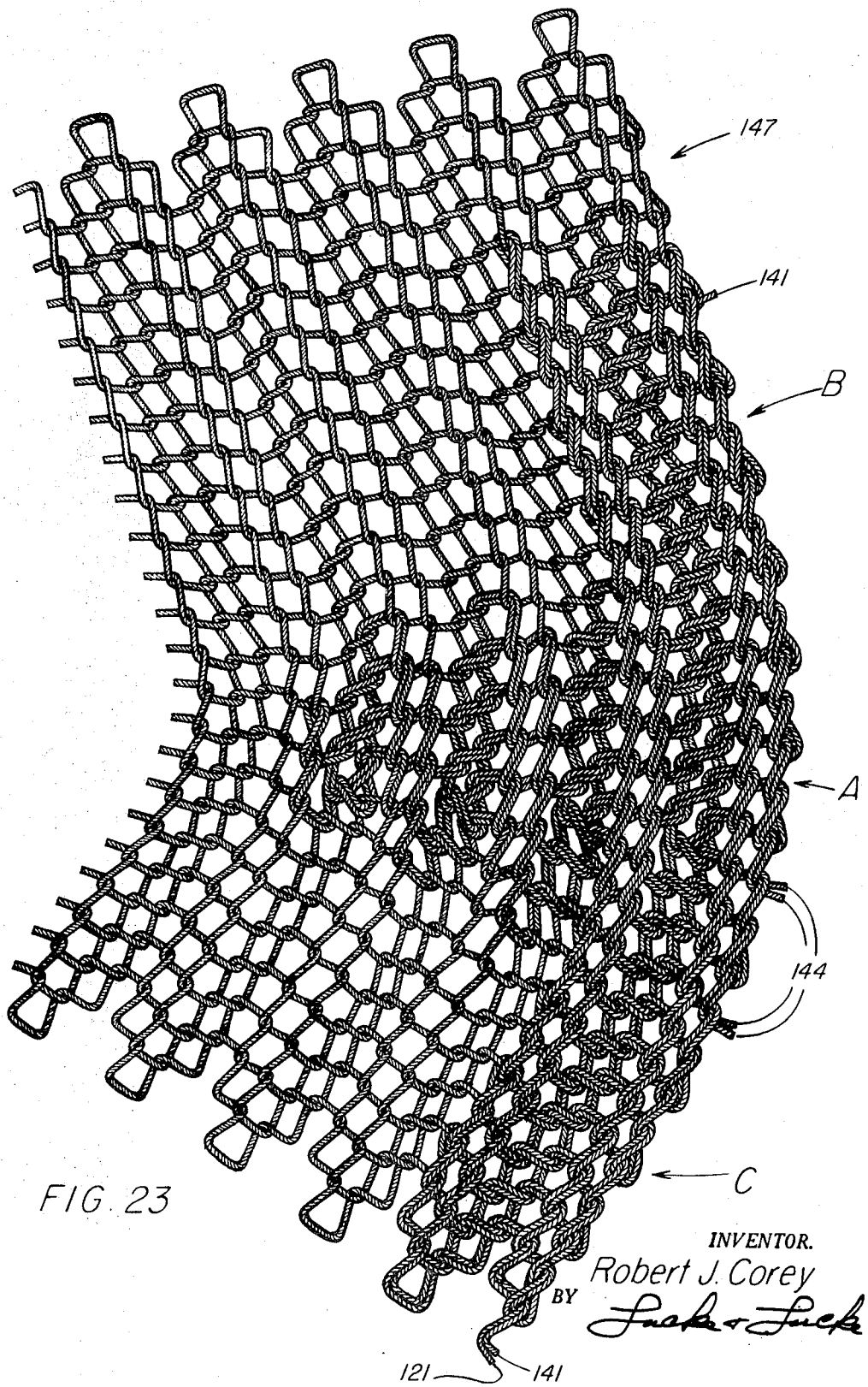
FIG. 23 is an enlarged partial view of a flat woven, double stretch stocking illustrating the method of forming the sole and ankle support with inserted heel.

It will be seen from FIG. 23 that the multiple thread heel portion A is knit woven with a double stich into the reinforced angle B and sole C portions of the double stretch flat stocking 147 by substantially the same process as the single stretch heel portion is woven into the single stretch flat stocking 143 shown in FIG. 19.

Figure 24:
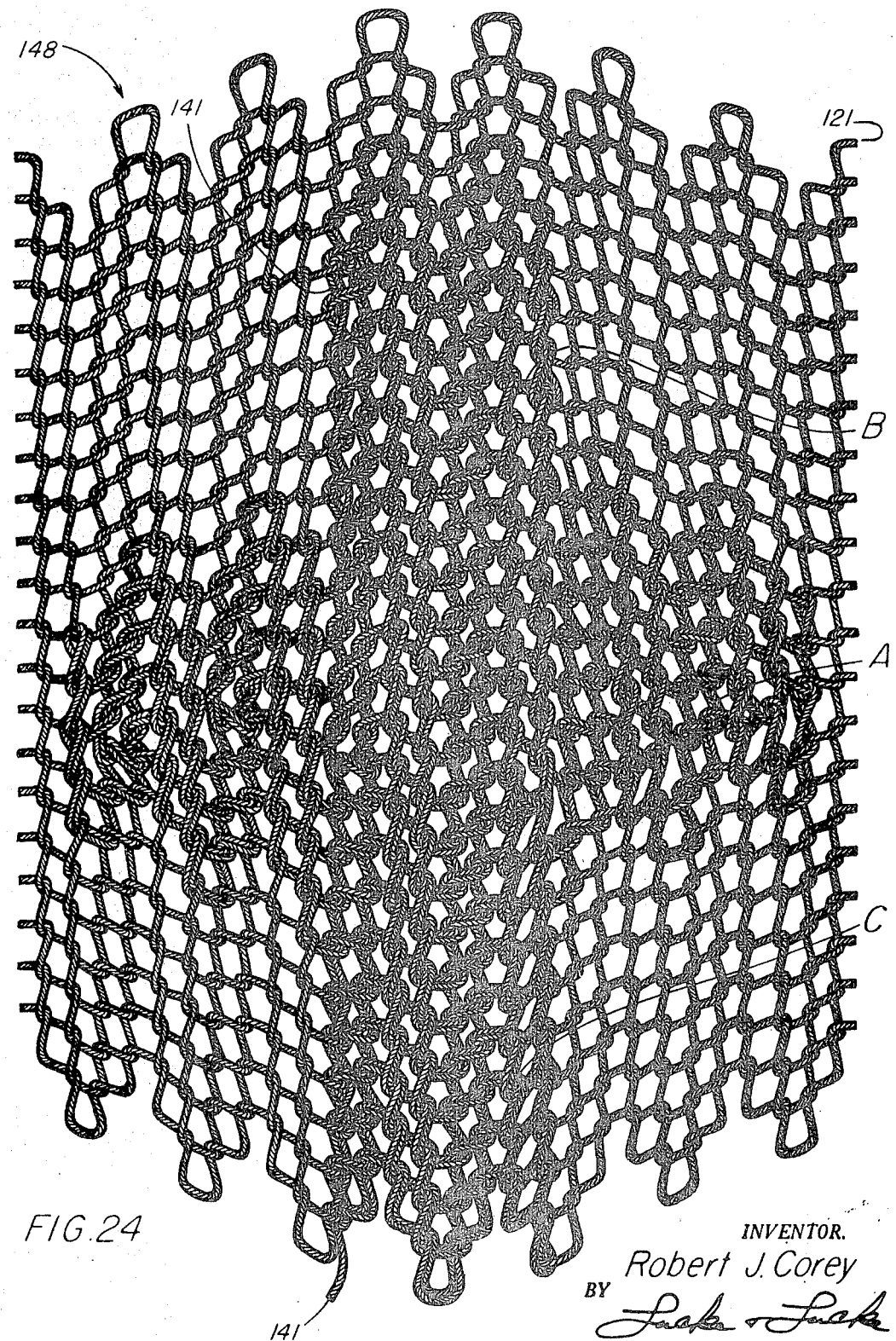
FIG. 24 is an enlarged sectional view of a tubular woven, double stretch stocking illustrating the method of forming a multiple thread sole and ankle support with inserted heel.

An integral reinforced sole, heel and angle portion ABC is made with an additional thread 141 knit woven with the single basic thread 121 in the double stretch tubular stocking 148 shown in FIG. 24 in a similar manner to the single stitch tubular stocking 145 illustrated in FIG. 20.

Due to the minute size of the innumerable stitches actually used in hosiery manufacture, it has been necessary to show these stitches on a greatly enlarged scale in all of the previous illustrations and to simplify the general weaving pattern. The end product, however, of a flat woven stocking 143 before seaming is shown in FIG. 25; and that of a tubular stocking 145 is illustrated in FIG. 26 with the respective heel, sole, toe and calf portions clearly indicated.

A method of making the knit type stitch weave by hand is graphically illustrated in FIGS. 27–30. In FIG. 27, a single stretch flat material 120 is shown being vertically woven over straight knitting bars 149a, 149b which may be suitably supported.

Three additional bars 149c are required to hold the body of the single stretch fabric 26 when it is knit woven in tubular form as shown in FIG. 28.

When more elastic material is desired, a correspondingly increased number of bars are required to make it. For example, there frame bars 149a, b and d are needed to vertically knit weave a double stretch fabric 132. As seen from FIG. 29, the thread on bobbin 150 is wound over the upper bar 149b to start a column of downwardly facing loops 123, then loosely under a stitch on the middle bar 149d to form a stitch in an intermediate column 135, thence under a loop on the lower bar 149a to start an inverted column 124, then one step up to the middle bar to form another intermediate column 135 before the thread is stepped up again to form the last stitch on the upper bar and complete the cycle.

These knitting or frame bars 149 are of special T-shaped cross-section with rounded, semi-circular heads to enable specially constructed shuttled 150 or the like to knit weave these particularly formed, looped stitches. The shuttle, as shown in FIG. 29, has four pointed ends and is cut, shaped and tempered from one piece of metal. The long outwardly curving point 150a is used to pierce through the looped stitches while the shorter, in wardly curved point 150b acts as a tension control. The base 150c or body of the shuttle is here shown wound with yarn or thread 121.

As seen from FIG. 30, when a two stretch fabric is made in tubular form, nine holding bars 149a, 149b, 149c and 149d are required to support this woven material 132a. Here the thread is initially wound or looped alternately over and under two bars as in FIG. 29. The thread is brought up and wound around the upper bar 149b from the other side so that it always proceeds in the same direction horizontally and in the same direction around the bar. As the thread is wound over and under the upper bar it is inserted into the loop around the middle bar and then into the loop around the lower bar to form the double stretch stitches 123a, 124a previously described. Then the thread is inserted into the loop of the lower bar on the other side, then into the loop around the mdidle bar and then completely around the upper bar to complete the cycle.

Only vertically formed sitches and vertical processes of knit weaving have been heretofore described relative to the drawings. An entirely new method of horizontally knit weaving fabric and especially that embraced by the invention will now be disclosed.

The single stretch fabric 120a of FIG. 31 is shown in the process of being woven horizontally in undetermined width over a plurality of individual straight horizontal combs. Two selvage threads 151, 151 which limit the predetermined length are tied at each end to a peg or pin 152, one of which is placed in a permanent holder comb 153a at the left edge and the other at the far right in a stationary selvage comb 153e. Each of ten separate threads 154 of predetermined length are tied at one end around a peg in a permanent holder comb and looped around a peg in comb 153d at the other end so that at the beginning ten parallel, evenly spaced threads numbered 1–10 extend between the two outer selvage cords 151. The looped end 155 of the first thread is removed from its original peg, passed around and under a selvage cord and under and then over the second thread to complete the first stitch of the first row 156 of horizontally formed loops. This motion is repeated until the entire row 156 is completed. Each finished row is then pushed over by one of the movable combs 153b, 153c toward the permanent holder comb 153a. It will be noted that two additional pegs 152, i.e., twelve in this instance, are used in each of the working combs. After weaving a row of stitches the looped end 155 of the second thread is removed from peg 3 before the first thread is looped thereover. Thus, the thread on peg 2 was originally on peg 1, and the thread on peg 3 was originally on peg 2, etc. In other words, the second thread was twisted over the first thread before the first thread was brought down to peg 2.

A row of looped stitches is shown being formed around the pegs on comb 153c. When completed, this comb will move the row to the left to increase the finished fabric now held in position by comb 153b. Whereupon comb 153b will be removed and placed in the present position of comb 153c to form the next row of stitches. Comb 153d is pulled in the direction of stationary comb 153a as the weave progresses and the threads become shorter. Pin 8 in comb 153c is broken to show how thread 6 is looped over thread 7 before these threads are placed on pins 7 and 8 respectively in row 153d.

FIG. 32 shows the method of shaping a piece of horizontally woven fabric by using curved loop forming combs 157 of any desired configuration or design. In this illustration, where a twelve thread fabric is being woven on fourteen pegged combs, thread 6 was looped over thread 7 and under thread 5 and then upwards over peg 7 in row 153d in order to form a curved shaped fabric by increasing the number of columns. A completed column is identified as 156a.

FIG. 33 shows how selected portions of a stocking such as a top hem or sole section C may be reinforced by the addition of other basic threads to a single thread fabric 120 woven with original threads numbered 1 to 12. Threads such as those numbered 16, 17 or 18 were added by looping over a peg in a comb 153b in the same manner as thread 13 is shown being looped over peg 1. The position of threads 13–15 show how the other multiple threads were added or are being added to create a reinforced section such as used for an ankle support B. Multiple threads 19, 20 and 21 were progressively inserted between separated threads 6 and 7 in a similar manner as threads 22 are shown in the process of forming another multiple thread stitch in order to form a cup or angular shaped section such as is required for a heel support A. The weave is separated whenever new threads are inserted such as indicated at 158, between threads 21 in the drawings. In this case the weave was begun with twelve rows of thread and increased to twenty rows.

The knit weave lends itself to being cut into any desired shape, after which its cut edges may be effectively seamed in one or more ways. The plain edge 159 in the upper left hand corner of FIG. 34 has been finished by a multiple thread zig zag stitch 160, each seaming thread being sewn on alternate sides of the last column of stitches. A portion of the cut material on the right hand side of FIG. 34 has been finished by a zig zag stitch over rolled edge 162. A serging stitch could be also used for this purpose. Any of these methods may be used to finish the plain ends of the flat material shown being horizontally woven in FIGS. 31–33 and to join edges made with a final selvage edge.

Horizontally woven material may also be made in indefinite widths by weaving it directly on a bolt 163. The bolt base or spool may be driven in any conventional way as by gears (not shown). The weave in FIG. 35 is moving to the right with each row 156 of stitches formed about the pegs in movable combs 153b, 153c, being pushed over in the opposite direction to that shown in FIGS. 31 and 32. In these prior illustrations the combs were furnished with limited lengths of thread to complete a relatively small sized piece of material. Here unlimited lengths of thread are carried on bobbins 164 which are twisted around the basic threads 1–10 in the same process steps as the looped ends 155 of the threads were woven in FIGS. 31 and 32. The two end spools (or bobbins) 164a on comb 153e for selvage threads 151 are released by tension springs (not shown) as the weave progresses.

It would be also possible to vertically knit weave a stocking on the apparatus shown in FIG. 35. The threads would then end at the hem line, but the anti-snag and anti-run lengthwise columns would be otherwise identical with the horizontal ones shown. The main difference would be a hem with a raw edge which would require folding over to form a double fold and then zig zag stitched similar to that shown in FIG. 34.

A cylindrical machine (not shown) can knit weave stockings vertically from toe to hem in either flat or tubular form, but in this case the tubular woven stocking would be only seamless.

A further step in the manufacture of a horizontally woven fabric is illustrated on a small scale in FIG. 36. In this illustration, two rows of six cones 165 of thread are supported on the rear wall 166 of a frame or rack 167 as by pins mounted thereon. Each of the twelve threads are led through holes 168 in one of two upper space bars 169 and then through equally spaced holes in a lower positioning bar 170 from which they extend in parallel position across the loom 171 for attachment to a bolt 164 mounted on rotatable spool 163a, as by means of a strip 172 secured by tacks 173. In actual practice, however, instead of making a fabric with only a dozen threads, a room full of combs, approximating 5400, may lead to the same row or bolt before it goes to loom.

Figure 37:
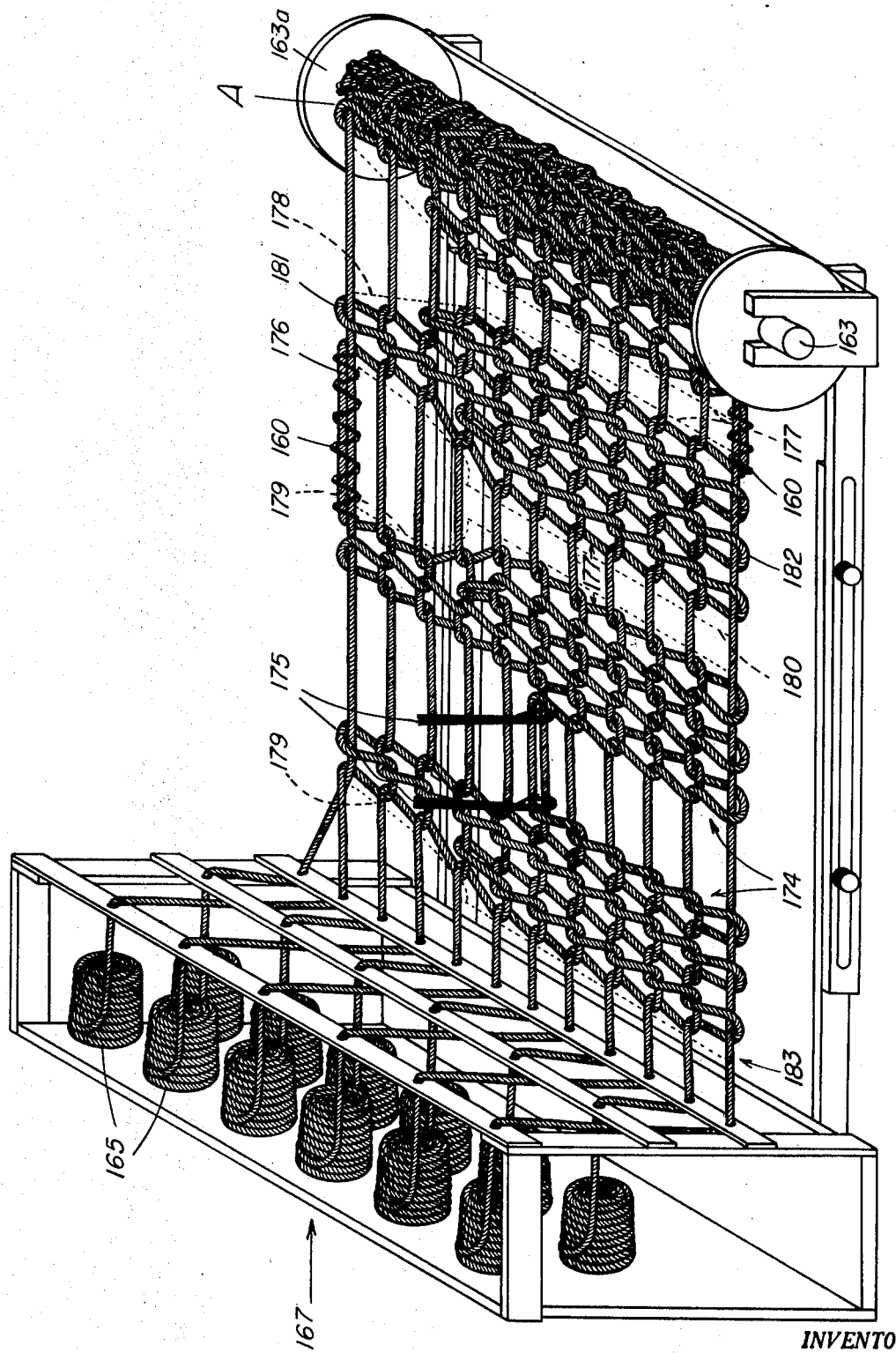
FIG. 37 is a perspective view of the apparatus shown in FIG. 36 upon which a series of preshaped vest front parts are being continuously woven and wound on a bolt as completed.

The apparatus shown in FIG. 36 is a foundation for weaving preshaped parts in bolts as will be clearly seen from FIG. 37. Here a series of vest front parts 174 are being woven. The needles 175 are initially spaced apart by the maximum required distance and move toward each other as the work progresses. It will be seen from FIG. 37 that horizontally woven garments are made from side to side.

The needles operate by picking up a thread released be a cone and looping it under or over the next thread. The last rows 176 are caught with zig zag stitching 160 or any other binder such as surging, before being cut to prevent ravelling. The parts for vest backs or sleeves are made on separate racks. Outer parts of the vest are indicated in dotted lines, such as the front edges 177, the neck line 178, armhole 179, and side seams 180. The shoulder line is indicated at 181 and the hemline at 182. Stockings can be economically fabricated by the same process and apparatus, in which case multiple threads are added to the basic weave during the regular weaving process at location 183, from one side to another, to reinforce the sole and ankle sections. Separate multiple threads for the toe and hem sections are then woven into the original or basic stocking fabric.

A different apparatus or foundation shown in FIG. 38 to that used for the flat weaving illustrated in FIGS. 31–37 is required to horizontally weave fabric in tubular form. For instance, a double bar 184 having a center split 185 to accommodate the needle and a solid bar 186 are used, both of which are releasably mounted in mutual spaced relationship in a frame or rack 167, by screws 182. Bar 186 is spaced a predetermined distance from the split bar to wind the necessary thread thereover. A needle or other looping mechanism passes in the center of the split bar. Another purpose of the lower bar, which is here shown broken in the center as at 188 to afford a full view of the first row of loops 189, is to separate and maintain the thread in evenly spaced indents 186a. The multiple threads 141 shown at the left are added to the single thread wherever required, such as for toe, hem and ankle sections, and are knotted in the same way as is the single basic thread 121 shown at the right before winding over the spaced bars. For an overall view of how this method of weaving is used in connection with stockings, see FIGS. 43–45.

For tubular horizontal weaving the selvage threads 151 are looped over the split bar 184 at each end and tied directly to the frame 167, here shown tied to a staple 190 or the like. As the weaving progresses, the threads shorten in length and the lower bar 186 moves in the direction of the split bar as seen from FIG. 39. The front portion of the split bar is broken to show how a needle 175 operates in the center opening 185 to pick up threads, weaving in, over and in between. After each row is finished it is consolidated with those previously completed by a very thin comb 153. Only one needle is used for making a major horizontal column 191 of "downwardly" facing stitches 123.

In commercial operations, the combs for regulating distance and tension can be made from the same thin sheet metal as watch springs, i.e., about .02" thick. The gauge, which may range from 300–500 or as much as desired, is increased in direct proporation to the thinness of the comb. Every tooth on these fine combs is capable of pushing down five or six alternate stitches. This is an additional advantage over conventional tricot knitting machines which are limited to approximately 60 gauge due to the thicknes of the needles and the necessity to hold each loop on a separate needle until a complete row is finished.

A shaped split or slit bar 192 and a shaped comb 157 are used in the frame 167 when the stitches are to be increased or decreased to conform to a particular shape. The comb must be changed whenever a greater or lesser curve is desired. Two needles 175 are shown in progress in FIG. 40, since the stitch is being drawn from underneath to make a minor column 193 of "upward" facing stitches 124. In this method, the selvage thread 151, used to keep the stitches in place, never moves during the entire weaving process.

A single thread stocking fabric is woven up to the predetermined position at which multiple threads are added for ankle, heel and toe support. Whenever an area is reached where multiple threads are required, pins 152 must be inserted through spaced holes 157a so as to project on both sides of the bar. The pins have no direct relationship with the bar 157 per se and are not inserted until the weaving reaches a certain stage. The thread from a spool or bobbin 164 is then alternately lapped around a pin on the forward side of the bar in a counter clockwise direction and then around the next pin on the other side of the bar in a clockwise direction as seen proceeding from left to right in FIG. 41, illustrating the process of making a heel section. The general direction of the thread is indicated by arows around pins numbered 11, 13 in the front of the bar and around pin 12 in the rear. Pins 16, 17 and 18 have been removed to show how the basic threads lie against both sides of the bar, how the pins are inserted and how the threads are squared together. Multiple threads around pins 1–9 are shown in proper position.

In FIG. 42, two rows of multiple ply fabrics 142 were horizontally woven above the single ply body weave 145a of FIG. 41 before the pins were removed from the bar. The multiple weave may now be continued indefinitely until this portion of the stocking is completed.

Partial views of tubular fabric and apparatus for hand weaving stockings have been shown in FIGS. 40–42, including the method of adding multiple threads and of decreasing and increasing stitches by means of a pin bar to conform to specific patterns.

Figure 44:
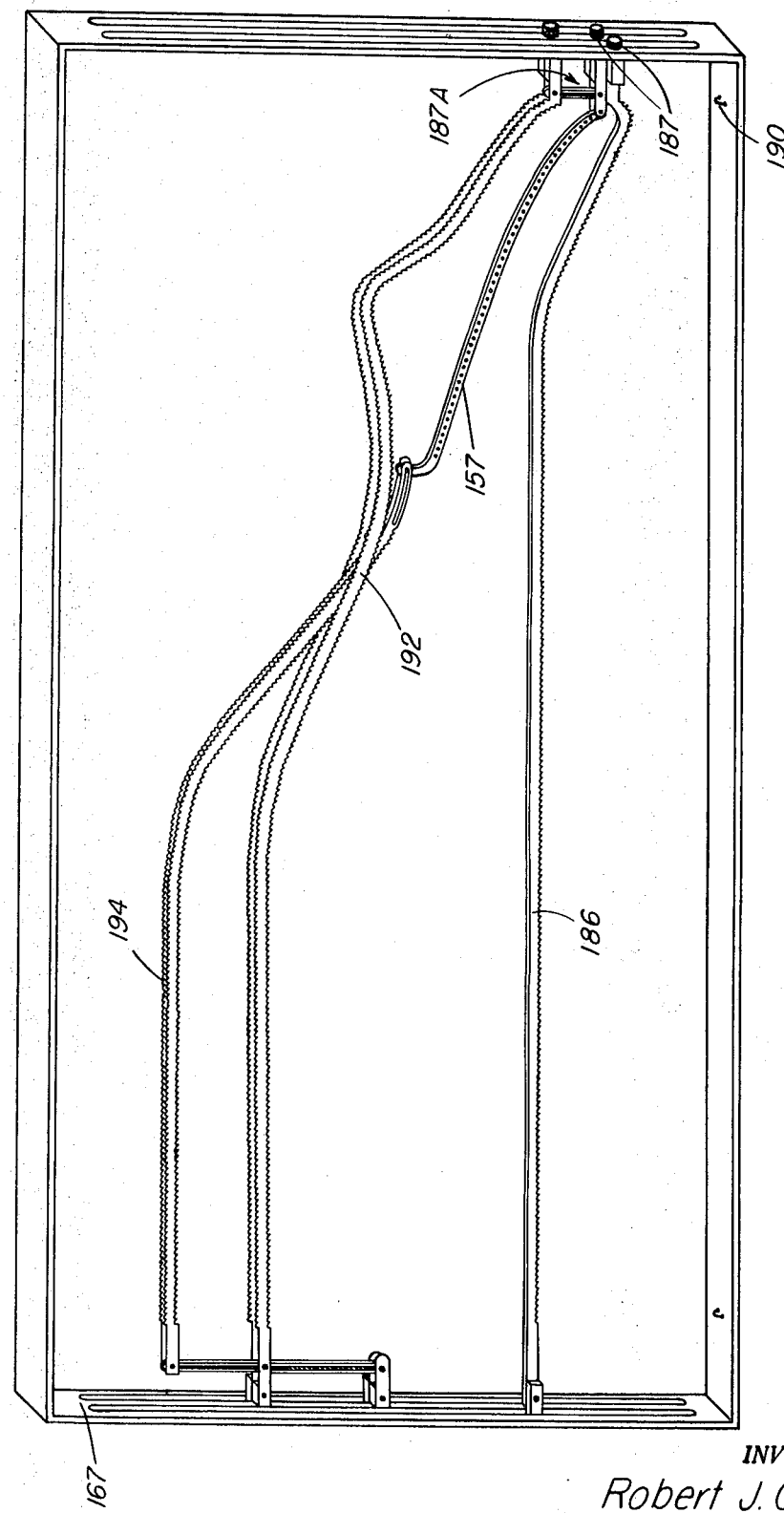
FIG. 44 is a sequence view to FIG. 43 showing the bottom bar moved to a higher position in order to insert the pins and add the thread as shown in FIG. 41.
Figure 45:
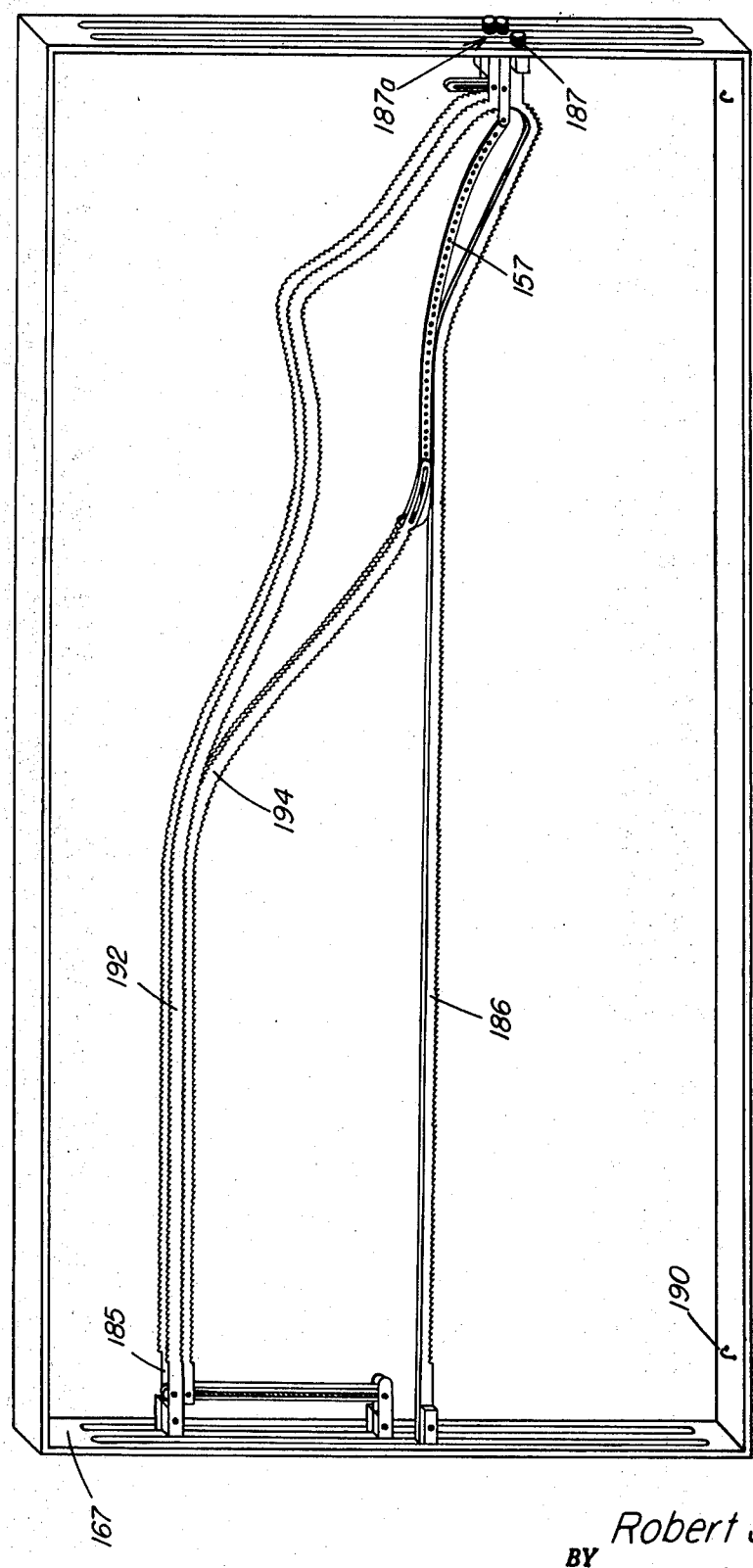
FIG. 45 is a further sequence view showing the position of the bars when the stocking is completed.

A full view of frame or rack 167 supporting the three bars required to knit weave a complete stocking in tubular form is illustrated in FIGS. 43–45. The shaped split bar 192 and lower solid bar 186 are separated a proper distance to have the necessary length of thread wound thereover, as shown in FIG. 38 to complete the body portion of predetermined sized stockings. The pin bar 157 is placed at the position at which multiple threads are to be added for the hem, heel, sole and ankle sections. Here the pin bar is attached to a carrier bar 194 which is mounted within split 185 in bar 192. The stocking is then woven by the same process as shown in FIG. 39 until the heel, sole and ankle support portions are woven as shown in FIGS. 41 and 42. The calf section is woven as shown in FIG. 40, after which the stocking is completed.

Assuming that a stocking is in the process of being woven in frame 167 as previously shown and described, it will be seen from the changing positions of thumb screws 187 how the lower holding bar 186 rises in the direction of the upper bars at the process weaving shortens the limited length of thread wound thereover. At the position shown in FIG. 44, the stocking would have already been woven to the sole, heel and ankle position. At this point pins 152 are inserted in the shaped bar 157 and multiple threads added as shown in FIG. 41. Several rows are then woven before the pins are withdrawn as shown in FIG. 42 and the horizontal weaving continued until the increased dimensions for the calf portion are completed. At this point it will be seen from FIG. 45 that the bottom rod or space bar 186 and the pin bar 194 have risen until both meet at the approximate position 187a of the split bar 192. This method is used in making seamless stockings one at a time.

In order to make or weave two flat stockings simultaneously on the same equipment, two lower bars similar to those in the upper portion of the frame are used. This would amount to using another set of upper bars 192, 194, but in reversed position. With this method, the weave would be started at the rear center with one calf pin bar 194–157 on either side. The weaving would then continue in opposite directions from both sides of the first horizontal column 189, always moving away from the starting column. After the weaving is completed at both ends, the two stockings are cut apart at the position of upper bar 192 and lower bar 192, then seamed at the calf to make one complete pair.

Figure 46:
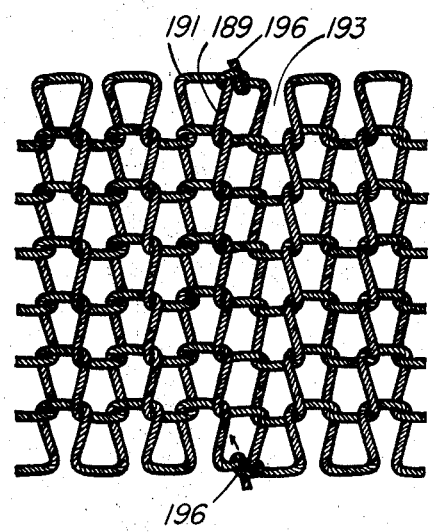
FIG. 46 is a partial view of a tubular woven fabric showing the starting column and the resulting opposite directional weave travel.
Figure 47:
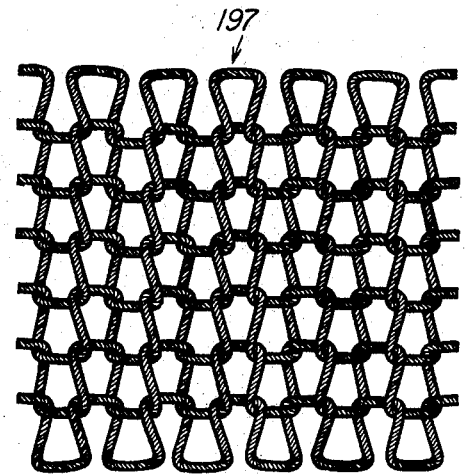
FIG. 47 is another partial view of a tubular woven fabric showing the final central column which is subject to run.

A portion of the tubular weave descried in making one stocking at a time is shown in flat form in FIG. 46. The threads are tied with a knot 196 which falls at the front center of the tubular seamless stocking to form a starting column 189 as shown in FIG. 38, after which the weave travels in opposite directions to a central back finish. As will be seen from FIG. 47, the final central column 197 of the tubular weave would be subject to run if appropriate steps were not taken to prevent unravelling.

Figure 48:
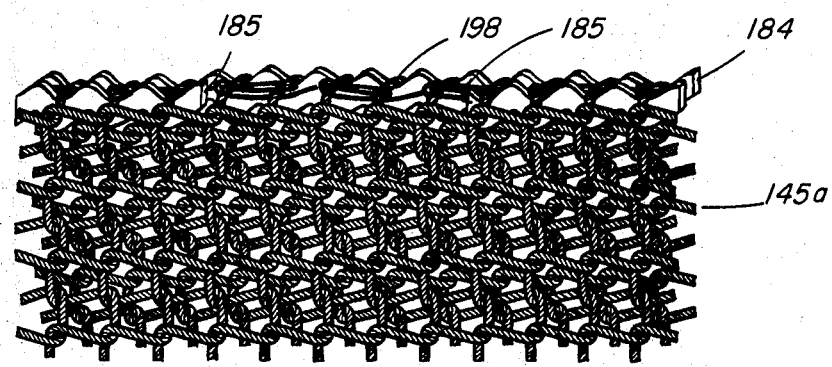
FIG. 48 is an elevational view of a portion of a seamed tubular stocking showing how the blocking of the final column is finished over a split frame bar.

In FIG. 48, a portion of the forward rail of a split bar is broken away at 185 to show how the final horizontal column 197 is finished by block seaming 198 before the stocking is removed from its split bar or frame 185. The details of finishing the last column are shown in flat form in FIGS. 49–51 with the split bar removed so that the blocking steps of the finishing seam can be easily followed.

Figure 49:
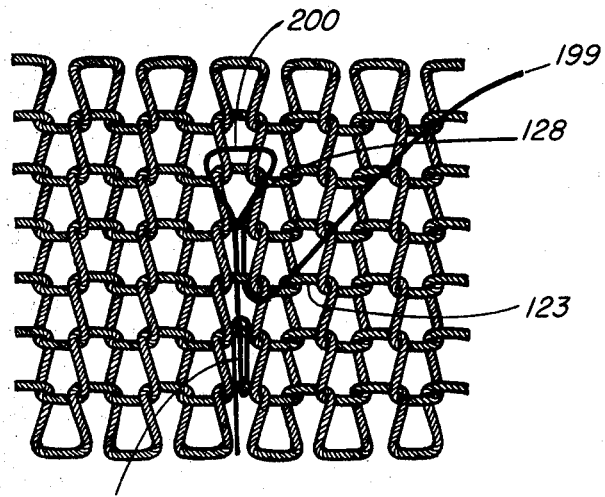
FIG. 49 is a similar view of a tubular woven fabric to that of FIG. 47 showing the first step of blocking the final column.
Figure 50:
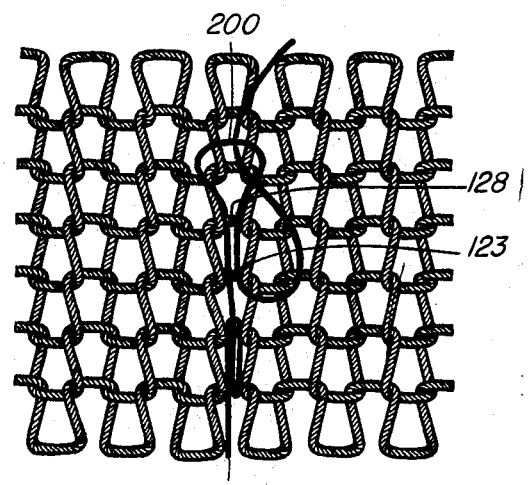
FIG. 50 is a sequence view to FIG. 49 showing the last step of blocking the final column.

The first steps of blocking the vulnerable last column 197 are shown in FIG. 49 where a blocking seam is in progress. Starting with a new seaming stitch in the third row, the finishing thread 199 as by means of a shuttle 150, has been inserted under two loops or stitches 123 and returned to the same position in order to make a large loop 200. The thread 199 is brought up, inserted through the loop and then pulled down over the same two stitches 123, 128, see FIG. 50, before repeating.

Figure 52:
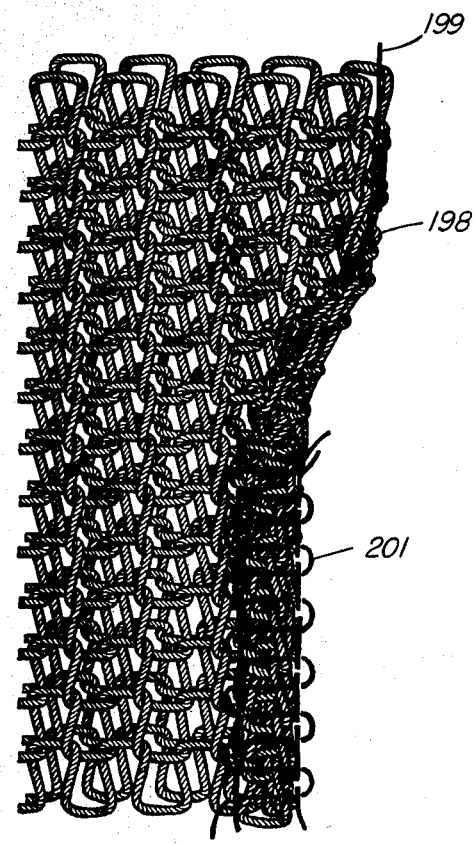
FIG. 52 is a partial view of a tubular stocking with a portion of the weave rolled over the blocking seam and further seamed by a regular stocking seaming machine.
Figure 51:
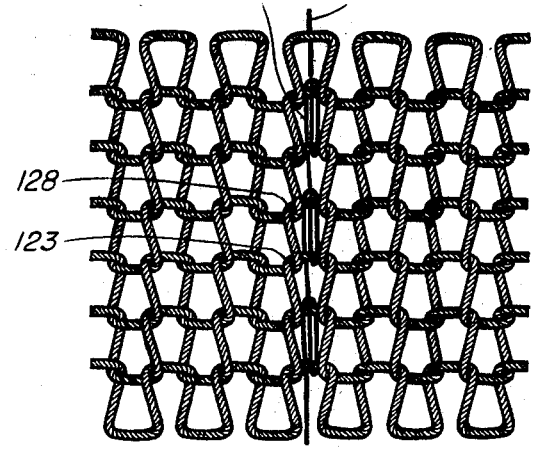
FIG. 51 is a sequence view to that of FIG. 50 showing the completed blocking of the final column in a seamed stocking.

When completed, the tightened blocking seam will appear as shown in flat form in FIG. 51. The position in which the seaming is actually effected on the split bar is shown in FIG. 48. This type of blocking stitch is used mostly for seamed stockings which are finished as shown in FIG. 52.

After removal of a tubular stocking from its frame, a seamed stocking may be made from it by rolling an edge over the blocking stitches for additional seaming 201 on a conventional stocking seaming machine. A sample of such additional seaming is shown in magnified form in FIG. 52.

Figure 53:
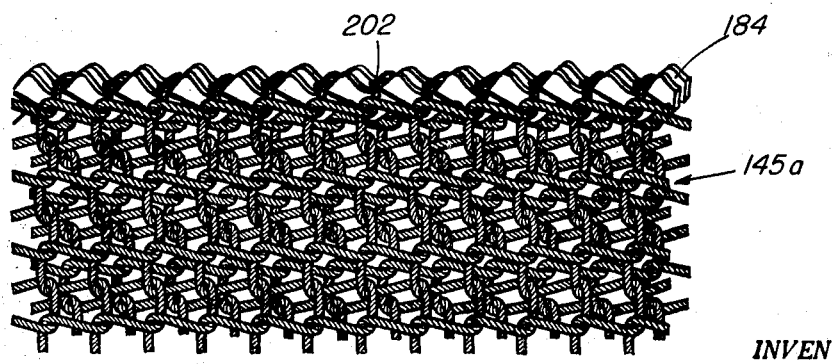
FIG. 53 is an elevational view of a portion of a full fashioned stocking showing an invisible blocking seam finished on a split frame bar.

The invisible blocking seam 202 for seamless full fashioned stockings is finished on the split bar 184, a portion of which is shown in FIG. 53. Advantageously, the same machine illustrated in FIGS. 38–45 is applicable to both types of inventory and can be selectively used for either. The adaptability of such machines to make both types of hosiery reduces manufacturing costs to a minimum. First, it would prevent loss of stock due to unpredictable changes of consumer demand or fashion. For instance, if a manufacturer makes an entire stock of seamless stockings with an invisible blocking seam, he could later add a regular seam to convert all or a portion of such stock to seamed stockings. Second, investment capital for machines, including repair parts, and factory space would be cut in half. Such reduction in manufacturing costs will make it possible to provide improved stockings at a reasonable retail price which will wear at least ten times longer than those presently available.

In order to make an invisible blocking seam for use on seamless stockings, etc., a different type of stitching is used to that used to make the readily visible seam 198 illustrated in FIGS. 49–52.

Figure 54:
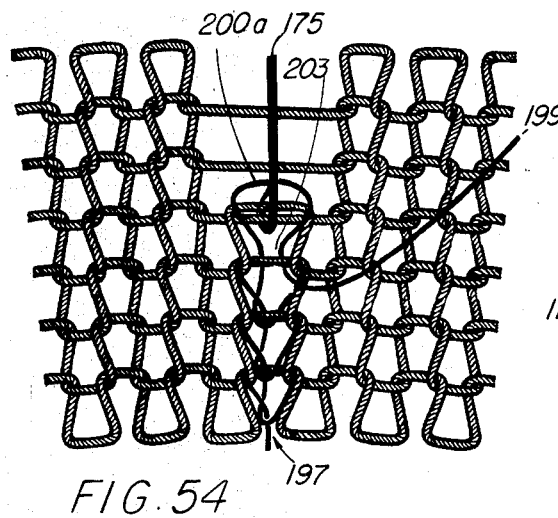
FIG. 54 is a partial view of a tubular woven stocking showing the first step of making an invisible blocking seam on the final column.
Figure 55:
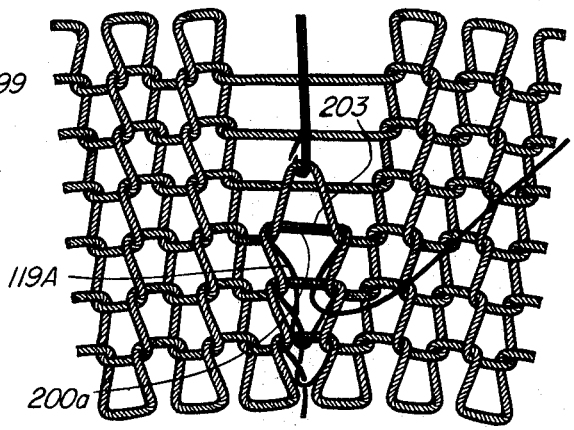
FIG. 55 is a first sequence view to FIG. 54 and shows the second step of invisible blocking.
Figure 56:
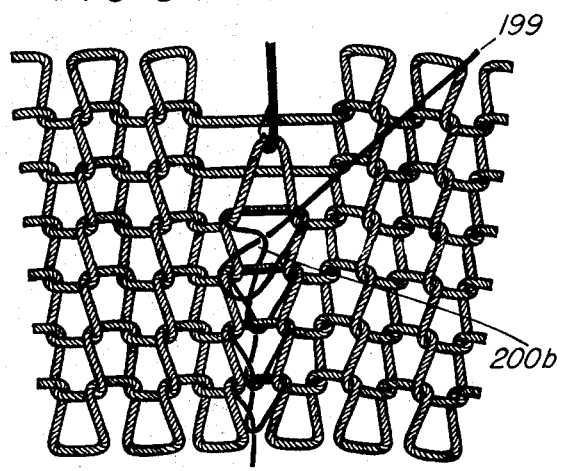
FIG. 56 is a second sequence view to that of FIG. 54 and the first sequence view to that of FIG. 55 showing the third and final looping of the blocking thread in each stitch.
Figure 58:
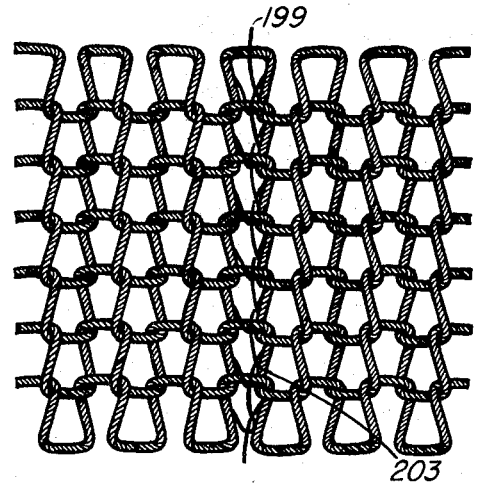
FIG. 58 is a fourth sequence view showing how the exaggerated blocking stitches shown in FIG. 57 appear from the opposite side of the fabric.

The three steps of making an invisible seam 202 are progressively shown in open position in FIGS. 54–56. It will be seen from FIG. 54 that the blocking thread first goes under one stitch 203 then around and in front of the needle 175 as it weaves the next stitch 203 in the last horizontal row 197 of a tubular weave. When the needle picks up the next bar or stitch the large loop 200a of blocking thread is pulled tight to conform to the contours of the preceding stitch as shown in FIG. 55. Before the needle weaves the next stitch, one side 200b of the blocking loop is enlarged for the shuttle to pass through it after which it is drawn tight to form a blocking loop over each stitch 203. When completed, the tightened blocking stitches overlie the sides of the last column 197 of woven stitching on both the right side of the weave as seen in FIG. 57 and on the reverse side as seen in FIG. 58 and are therefore invisible to the naked eye.

Figure 57:
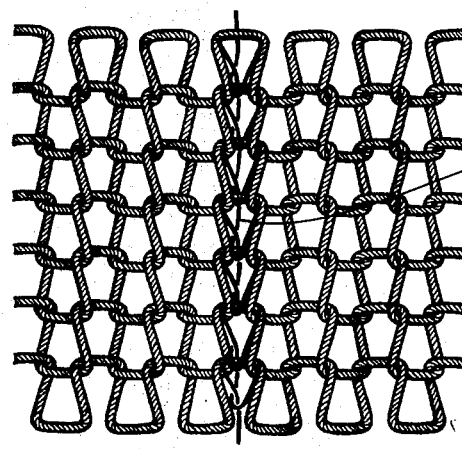
FIG. 57 is a third sequence view, and shows the blocking stitch in final form. The connecting loops have been exaggerated for clarity, since in actual practice they overlie the side columns and are invisible to the naked eye.

It is understood of course that the blocking stitches, including the finished invisible seam 202 shown in FIG. 57, have been exaggerated in order to be discernable. If viewed from the reverse side of the fabric, the seam would appear as shown in FIG. 58. In actual practice, the seaming would be done on a split bar 184 as shown in FIG. 53.

Figure 59:
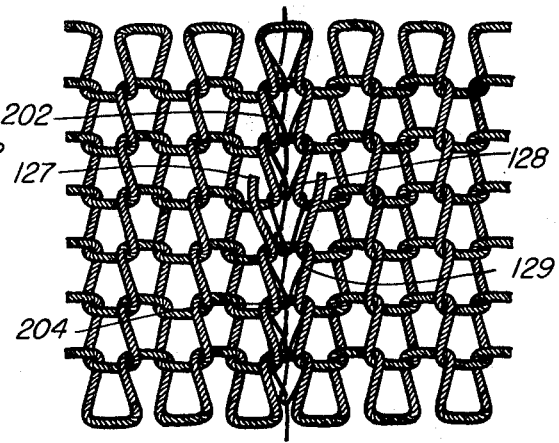
FIG. 59 is a fifth sequence view showing how a completed invisible blocking stitch will hold the fabric together in the event a weave thread is broken.

Should the weave thread in the vulnerable column be broken after the stocking is finished, the blocking stitches of the invisible seam will prevent it from running as shown at 204 in FIG. 59.

Figure 60:
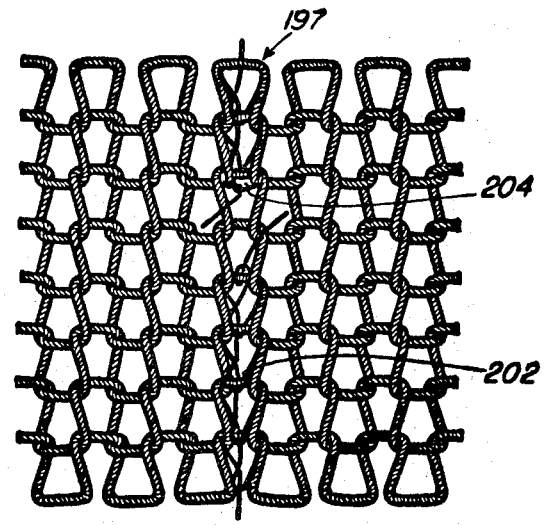
FIG. 60 is a similar view to that of FIG. 59 showing the effect resulting from breakage of an invisible blocking stitch.

FIG. 60 shows how a broken invisible blocking stitch also knots at both the top and bottom around woven stitches so as to make a run impossible in vulnerable column 197.

Figure 61:
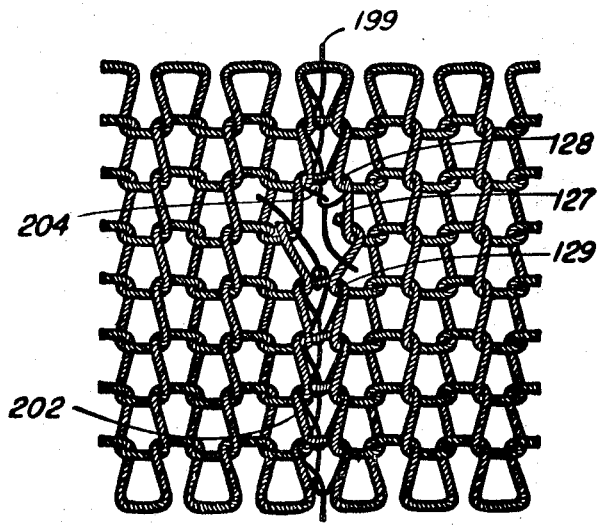
FIG. 61 is a similar view to that of FIG. 60 showing a broken stitch in both the final column and the blocking seam.

Should a break occur in both the invisible seam 202 and last woven column 197 it will be seen from FIG. 61 how knotting of the seaming thread will positively prevent any runs whatever from developing in the fabric.

Figure 62:
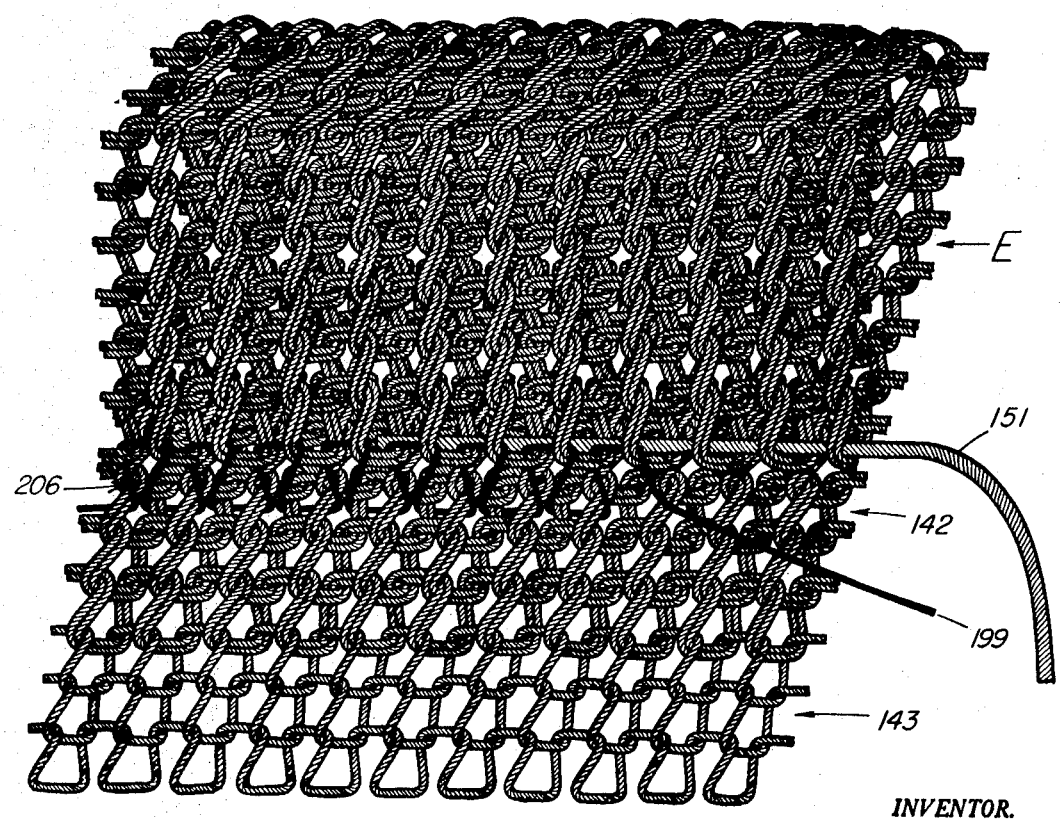
FIG. 62 is a partial view of a knit weave fabric showing the three steps of hemming any knit weave article, namely, folding, stitching and finally withdrawing the selvage thread.

FIG. 62 shows the three steps of forming a hem E in all types of horizontally woven stockings. That is, all stockings are hemmed the same way, whether of single or multiple ply and regardless of the degree of elasticity. The portion at the right of this figure is shown in the first stage of being folded over with the selvage thread 151 still running through it. The middle portion of the drawing shows the selvage thread being pulled out after the end of the folded hem portion E has been stitched to the under-lying reinforced body fabric 142. And on the left hand side of FIG. 62, the hemming operation 206 is shown in finished form. Before the selvage thread is completely withdrawn, the toe portion of the stocking will also be closed in the usual manner of conventional stockings.

Figure 63:
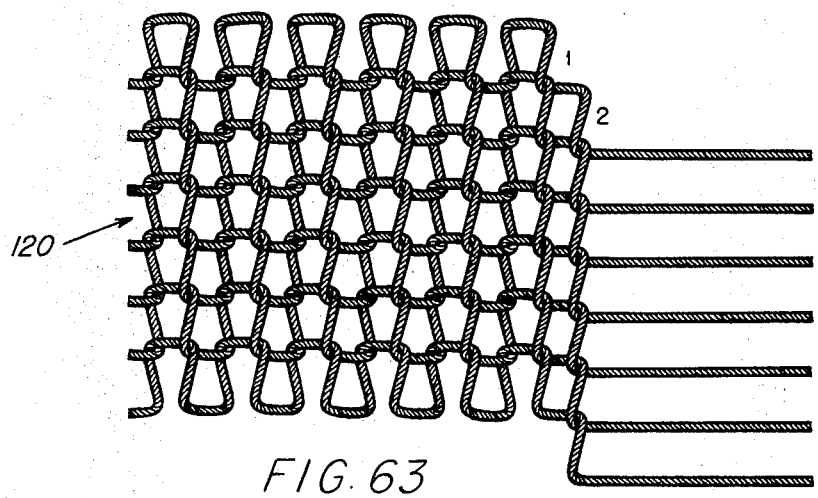
FIG. 63 is a partial view of a horizontally knit woven fabric showing the method of changing from a single stretch pattern to a double stretch pattern.
Figure 64:
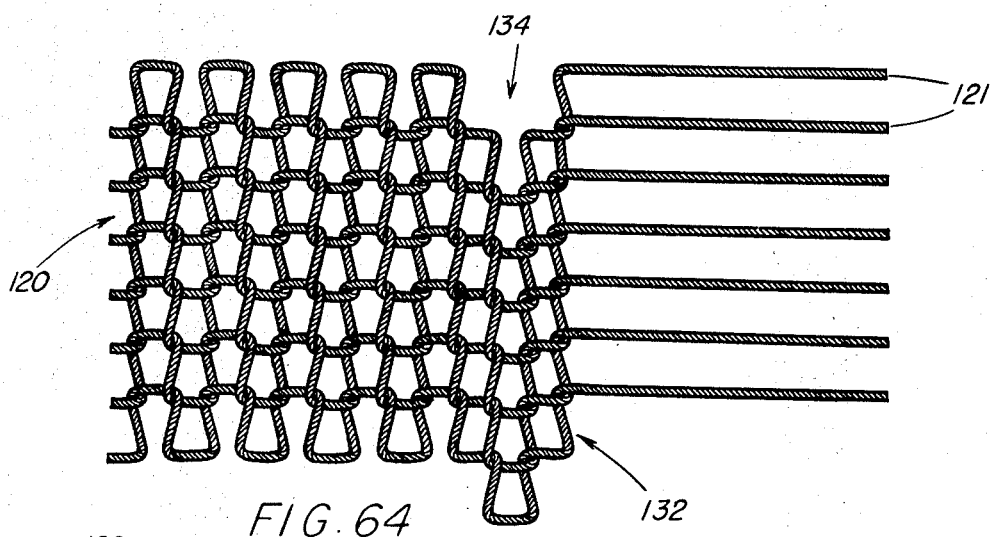
FIG. 64 is a sequence view to that of FIG. 63 showing the completion of a section of double stretch weave.
Figure 65:
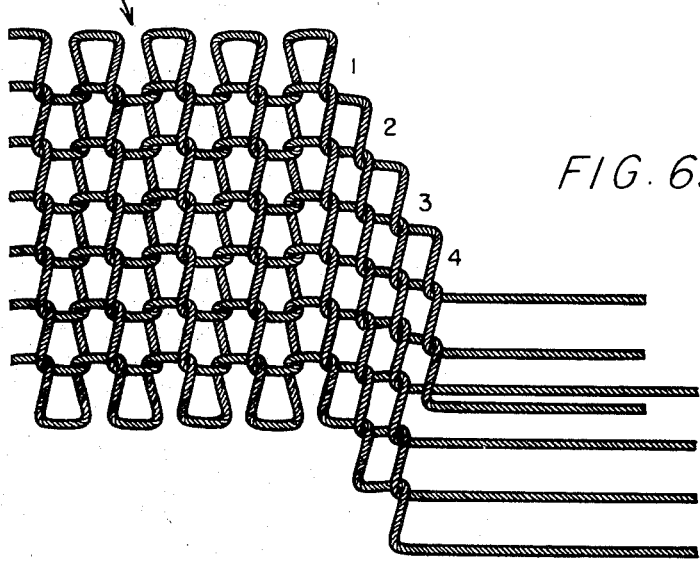
FIG. 65 is a partial view of a single stretch horizontally woven fabric showing the process steps of converting it first into a three-stretch and then starting to form a four-stretch elastic section.

The very close relationship of the single stretch basic weave to all it more elastic modifications is graphically demonstrated in FIGS. 63–65. Starting at the left of these figures with a section of single stretch fabric, it will be seen that this basic stitch can easily be converted into areas of greater elasticity, the degrees of which may be varied and, if desired, be reconverted to the original basic weave.

For instance, a single stretch fabric 120 may be changed into a double stretch fabric simply by making two laps with the needle instead of one in the same direction as shown in the last woven column in FIG. 63. To complete a double stretch portion 132, the steps are reversed by making two consecutive laps in the opposite direction to form a four column funnel 134 as shown in FIG. 64.

However, any degree of stretch can be obtained simply by increasing the number of laps taken in one direction before taking laps in the opposite direction. For example, the single stretch weave in FIG. 65 is shown at a stage where a triple stretch is in process of going into a four step down quadruple stretch. This is accomplished by simply overlapping four times in the same direction before underlapping four consecutive times in the opposite direction.

Figure 66:
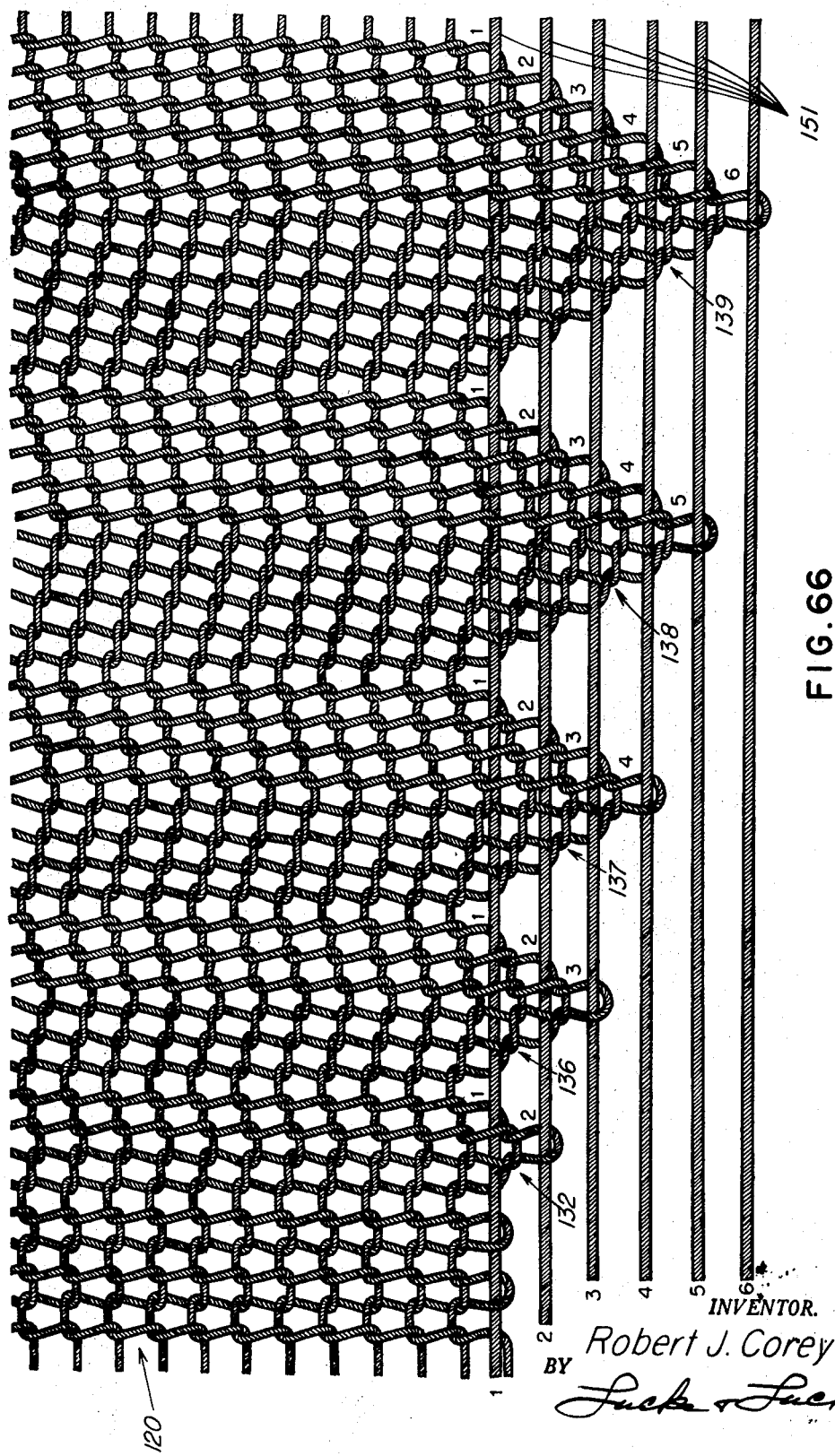
FIG. 66 is a plan view of a single piece of fabric showing the horizontal steps of progressively increasing the elasticity of a material from single to sextuple stretch and ad infinitum.

A comparable view of a multi-stretch fabric and the simplified process of producing it is illustrated in FIG. 66. Here a single piece of fabric is shown ranging from a single to a six stretch and incorporating the weaves shown separately in FIGS. 1, 6 and 13–16. It will be understood, that the elasticity could be increased to any practical degree by continuing to increase the same weaving steps. A selvage thread 151 must be provided to support the irregular stitches in the last row of each modified phase of the elastic fabric. Thus six selvage threads 151 are required for a six step down, 6 step up sextuple stretch fabric 139, only 5 for a quintuple 138 and progressively less for each decreased degree of stretch to only one selvage for the regular, even stitches of the single stretch fabric 120. This process of producing increased and decreased stretchable fabric is applicable to both flat and tubular types of construction and may be woven into any shape or form. Some of the uses for multi-stretch fabric might include a stocking with a single stretch body portion having six stretch knee and heel portions. It could also be made into form fitting head to toe garments having areas of various elasticity located at appropriate anatomical positions.

In addition to hoisery this new weave lends itself to the making of piece goods by the yard, finished, ready to wear garments, and many other items of unlimited scope. It also lends itself to "woven in" decorations, invisible seaming on the straight and on the bias of the weave and many other novel variations in structure as well as all those known to the tricot trade.

This new weave can be woven of any type of natural or synthetic yarns, from the finest to the grossest and from the thickest to the thinnest. Also, this weave can be made into any desired type of garment or knit woven article.

I claim:

1. A method of knit weaving a non-run blank consisting of the steps of knitting at least one thread into a first course of one row step-up, one row step-down loops, each of said loops having two legs and a bight portion therebetween, weaving selvage edges at the end of each course, reversing the direction of said thread to intertwine said legs in said first course and to interlock each said loop at both corners of its bight portion, including the step of looping said thread in alternate rows again through the middle of a stitch in each preceeding row to increase the width of said blank.

2. A method of knit weaving a tubular non-run fabric consisting of the steps of continuously vertically knitting at least one thread into a first circular course of one row step up and one row step down loops, each of said loops having two legs and a bight portion therebetween, continuing to knit-weave said loops in the same circular direction by intertwining said legs in said first course while simultaneously forming a succeeding circular course of vertically knitted and horizontally interlocked loops, and finally blocking the loops in the last circular course of said tubular fabric.

3. A method of knit weaving a tubular non-run blank comprising the steps of vertically knitting at least one thread into a first course of at least two steps up and an equal number of step down multiple stretch loops having two legs and a bight portion therebetween, then intertwining said legs in said first course and simultaneously forming a succeeding course of vertically woven and horizontally interlocked loops.

4. In the manufacture of a flat, non-run knit woven stocking from at least one basic thread, the method of knit weaving a reinforced sole, heel and ankle portion thereof comprising the steps of introducing at least one additional thread to said basic thread at a predetermined point of said stocking, horizontally weaving said additional thread to and from an outer selvage edge to an inner selvage edge to form a narrow sole portion, increasing the inner stitches of said reinforced rows to define the depth of said heel portion, decreasing the inner stitches of said heel portion to form a substantially triangular shape, introducing two or more multiple threads to weave a reinforced heel portion within such triangular shape, continuing to weave said additional thread to and fro between said outer and inner selvage to form said ankle portion and then returning to weaving said stocking with only said basic thread.

5. In the manufacture of a tubular non-run stocking having at least one basic thread, the method of knit weaving an integral sole, heel and ankle portion thereof, comprising the steps of introducing at least one reinforcing thread and weaving said basic and reinforcing threads to form a centrally disposed sole portion, progressively increasing the reinforced stitches on either side of said sole portion to form a heel portion extending laterally therefrom, progressively decreasing said heel portion and then resuming a second centrally disposed reinforced section to form an ankle portion coaxial with said sole portion.

6. Apparatus for manually making flat non-run, knit woven material comprising a loom, a bobbin carrier adapted to support a plurality of displaceable threaded bobbins equal in number to make a desired width of said material, a selvage thread carrier disposed at one end of said loom, a pick-up roller disposed at the opposite end of said loom, a control comb and a pin comb, said pin comb having exchangeable pins disposed thereon, a thread from each of said bobbins adapted to extend from said control comb through said pin comb to said roller and a selvage thread adapted to extend across said loom on either side of said threads from said carrier to said roller.

7. A method of making flat, non-run woven knit material comprising the steps of extending basic threads from a plurality of bobbins through a pin comb and a control comb to a pick-up roller, extending a selvage thread on either side of said basic threads from a carrier therefor to said roller, consecutively overlapping one bobbin under and over the basic thread from the next bobbin to form a row of knit woven stitches around the pins on said pin comb, removing said control comb, combing said row of stitches toward said roller with said pin comb, placing said control comb in said pin comb's original position, knit weaving with said bobbins around pins disposed in said control comb, and repeating said combing and weaving process until the desired length of said material is completed.

8. Apparatus for knit weaving flat non-run preshaped articles such as garments comprising a frame having an adjustable base, a thread cone carrier disposed at one end of said frame, a pick-up roller disposed at the opposite end of said frame, said carrier adapted to support a plurality of threads extending from said cones across said frame to said roller, said roller adapted to wind articles therein knit woven from said threads.

9. The method of making a continuous length of preshaped articles such as garments of flat non-run knit weave comprising the steps of extending a plurality of threads in the desired width from a cone carrier disposed between two selvage threads across a frame to pick-up roller, forming stitches with at least two needles operating simultaneously from opposite sides of separate parts of each said article toward the other side thereof, reversing the operation from underneath said threads and decreasing and increasing said stitches until said article is completed.

10. The method of making a continuous length of preshaped articles according to claim 9, including the steps of binding said parts to said selvage threads, then winding said parts on said roller and thereafter cutting each said part for completion of said article.

11. Apparatus for knit weaving non-run articles such as garments in tubular form comprising a frame having a top, a bottom and two sides, longitudinal slots disposed in said sides, a slit bar extending between said slots near the top of said frame, a solid bar extending between said slots near the bottom of said frame, said bars having thread retaining indents thereon, releasable means associated with said slots for adjustably spacing said solid bar from said slit bar, selvage thread securing means disposed on said bottom and a displaceable comb associated with said bars.

12. Apparatus for knit weaving non-run tubular articles according to claim 11, wherein said slit bar and said displaceable comb are preshaped to produce articles of various configuration.

13. Apparatus for knit weaving non-run tubular articles according to claim 11, wherein said displaceable comb is provided with a series of spaced apertures therein and a plurality of removable pins insertable in said apertures for projection from both sides thereof, said pins serving as multiple thread retainers for reinforced sections of said articles.

14. The method of making a non-run article in tubular form comprising the steps of spacing a solid bar a predetermined distance from a slit bar, winding a required length of basic thread from under said solid bar over said slit bar while simultaneously forming a first row of stitches on said solid bar, placing a pin comb having pins extending on either side thereof in a predetermined position, then knit weaving progressive rows of stitches until reaching said comb, winding multiple threads over opposite sides of said pins in alternate clockwise and counter clockwise directions and continuing to knit weave a combination of said basic and multiple threads to form a reinforced section of said article.

15. Apparatus for knit weaving non-run articles according to claim 11, having a first and second slit bar, said first slit bar being adjustably mounted in said slots for movement within the slit of said second slit bar, said solid bar and slit bars being initially positioned at a predetermined distance to receive a desired length of basic threads wound thereover and said bars adapted to move toward each other as said threads are knit woven into one of said articles.

16. Apparatus for knit weaving tubular non-run articles according to claim 11, including an adjustable pin comb and wherein said solid bar conforms to the front of a stocking, said second slit bar conforms to the final shape of a finished stocking and said first bar is provided with a first and second section thereof, said first section conforming to the calf of a stocking and said pin comb forming said second section, said first section being initially positioned to extend the length of said thread beyond said second slit bar in compensation for length of thread required to knit weave the calf portion of said stockings.

17. The method of knit weaving an article in tubular form comprising the steps of spacing a solid bar a predetermined distance from a slit bar, extending a loop of selvage thread from both ends of said slit bar beyond said solid bar to limit one dimension of said articles, securing said selvage threads in such position, securing a length of at least one basic thread at one end of said solid bar, winding it over said slit bar, continuing to wind said basic thread over said slit bar while simultaneously forming a first row of knit weave stitches on said solid bar by interlocking each loop thereon with said selvage threads, combing each successive row toward said first row, operating a first needle through said slit bar from left to right to make an overlapping row of stitches, then alternately operating said first needle and a second needle in the opposite direction to make an underlapping row of said stitches and reversing said needle operating steps while moving said solid bar toward said slit bar as said knit weaving shortens said basic threads wound between said bars.

18. The method of knit weaving an article according to claim 17, including lifting one of said basic threads with said first needle while making a loop and drawing said loop through said lifted thread with said second needle.

19. The method of knit weaving an article according to claim 18, including projecting removable pins from both sides of a comb and adding multiple threads to said basic thread over said bars at a predetermined point for reinforcing portions of said articles.

20. The method of knit weaving an article according to claim 17, including the steps of inserting a pin bar having pins projecting from both sides thereof between said basic threads at a predetermined point, securing at least one additional thread to one end of said pin bar, winding said additional thread alternately from under one side of an extending pin over said slit bar to under the other side of the next pin, and continuing to knit weave said basic and additional threads and comb said rows of stitches to form a reinforced section of said article.

21. The method of knit weaving an article according to claim 20, including the steps of removing said pins at the termination of said reinforced section and continuing to knit weave said basic threads to complete said article.

22. The method of knit weaving a tubular stocking comprising the steps of spacing a shaped solid bar a predetermined distance from a first shaped slit bar, mounting a second shaped slit bar over said first slit bar, winding a required length of basic thread from said solid bar to said first slit bar and simultaneously forming a first row of knit woven stitches on said solid bar, thereafter vertically knit weaving progressive rows of horizontal stitches until reaching the position of a pin comb, adding multiple threads in alternating clockwise and counter clockwise directions over the pins extending through said comb to form reinforced toe, sole and heel portions of said stocking, then removing said pins from said comb and continuing to knit weave said basic thread until reaching the position of the hem portion, again adding multiple threads as heretofore to reinforce said hem portion to complete said stocking.

23. The method of simultaneously making two flat knit woven stockings in a single apparatus comprising the steps of spacing a first and second shaped slit bar in reverse position from a third and fourth shaped slit bar, mounting said second and fourth bars over said first and second bars respectively, winding a required length of basic thread from said first and second bars over said third and fourth bars while simultaneously forming a first row of knit woven stitches over said first and second bars, weaving in opposite directions from both sides of said first row toward pin combs associated with said first and third bars, adding multiple threads in alternately clockwise and counter clockwise directions over both sides of pins extending through said combs to form toe, sole, heel and ankle portions of said stocking, then removing said pins from said comb, continuing to knit weave said basic thread until reaching the position of the hem portion, again adding multiple threads as heretofore to reinforce said hem portion, then cutting said tubularly knit woven pair at the final position of said second and fourth bars and finally seaming each of said stockings to make a completed pair of seamed stockings.

24. The method of knit weaving an article in tubular form according to claim 17, including the step of blocking the last row of final stitches by first inserting a blocking thread through said slit bar under two of said final stitches, returning said blocking thread to its starting position to form an open loop, then inserting said blocking thread through said loop and finally pulling down over said two stitches before repeating said blocking process to form a visible blocking seam on said article.

25. The method of knit weaving a tubular stocking according to claim 22, including the step of blocking the last row of final stitches by first inserting a blocking thread through said slit bar under said two stitches, returning said blocking thread to its starting posiiton to form an open loop, then inserting said blocking thread through said loop and finally pulling said thread down over said two stitches before repeating said blocking process to form a visible blocking seam on said stocking.

26. The method of knit weaving a tubular stocking according to claim 22, including the steps of removing said stocking from said frame, then rolling a part of said stocking over said blocking stitches to make a seamed stocking.

27. The method of knit weaving a tubular stocking according to claim 22 up to the final row of knit woven stitches, including the steps of simultaneously knit weaving a first stitch in said final row with a needle and pulling through a blocking thread under said stitch with a shuttle, bringing said blocking thread around and in front of said needle as it weaves the next stitch, pulling said blocking thread tight over the contours of said first stitch as said needle picks up the next stitch, enlarging one side of a blocking thread loop and passing said shuttle through said loop before weaving the following stitch with said needle to form an invisible blocking seam on said stocking.

28. The method of making an invisible blocking stitch for the final row of tubular knit woven stitches, comprising the steps of simultaneously knit weaving a first stitch with a needle in said final row and pulling a blocking thread from under said first stitch, then looping said blocking thread around in front of said needle, passing said needle through said loop as it picks up a second stitch, pulling said blocking thread tight over the contours of said second stitch, forming a side loop of said blocking thread and passing said blocking thread through said loop and finally pulling said blocking thread tight to form a series of invisible blocking stitches proximate one side of said knit woven stitches before repeating said blocking process.

29. The method of blocking a final row of tubular knit woven stitches, comprising the steps of inserting a blocking thread under two of said stitches, returning said thread to its starting position to form an open loop, then inserting said thread through said loop and finally pulling said thread down over said two stitches before repeating said blocking process.

30. A method of horizontally and vertically making fabric from at least one thread having integral sections of variable stretches from single stretch stitches to an infinite number of stretch stitches, said method comprising the steps of knit weaving a selected number of courses of one step up and one step down stitches, then knit weaving any desired number of increasingly stepped up and stepped down stitches.

31. A method of making a fabric according to claim 30, including the steps of knit weaving any desired number of diminished step up and step down stitches in said sections thereby decreasing the stretches thereof from any degree of stretch to said single stretch sections.

32. A method of horizontally making a predetermined length of flat, knit woven material comprising the steps of knotting each of a series of basic threads around a peg placed in a first permanent holder comb, making a loop at the opposite end of said threads, placing each of said loops around a corresponding peg in a second permanent holder comb, tying a selvage thread around an outer peg in said first holder comb on either side of said basic threads, extending said selvage thread beyond said second holder comb and tying the other ends thereof to an aligned peg in a stationary selvage comb, placing a movable pin comb intermediate said first and said second permanent holder combs proximate the latter, removing the looped end of the first basic thread from the first peg in said second comb, passing said first thread around and under its proximate selvage thread and over and under the second basic thread, removing the second loop from the second peg and looping said first loop over said second peg to complete the first stitch in the first row of said material, passing said second thread around and under the first basic thread and over and under the third basic thread, removing the looped end of said third thread from the third peg in said second comb and placing the second looped thread over said third peg, continuing to knit weave each of said threads around and under its preceding thread and over and under its following thread until completing the first row of said material by passing the last basic thread around and under its preceding thread and over and under its proximate selvage thread, combing the stitches formed around said movable comb toward said first permanent comb, then placing a second movable pin comb in the previous position of said first movable comb and proceeding to form a second row of said material around the pegs in said second movable comb by reversing the procedure of the first row, restoring each of said loops on their original pegs until the first loop has been replaced over said first peg.

33. A method according to claim 32, including the steps of forming said stitches around said pegs seated in curved movable combs to increase and decrease the stitched fromed in said rows to shape said material.

34. A method according to claim 32, including the steps of horizontally adding at least one reinforced portion of said material, said steps comprising looping a length of a multiple thread over a basic thread around alternate pegs and said first movable pin comb, and knit weaving said basic and multiple threads together.

35. A method according to claim 34, including the further steps of forming a flat heel section in said material, said steps comprising separating said basic threads into two equal parts, placing each said thread over a peg disposed on either side of said comb, looping a predetermined number of multiple threads over pegs disposed in the middle of said comb intermediate said two parts and continuing to pass each multiple and basic thread around and under its preceding stitch and over and under its following thread.

36. Apparatus for vertically knit weaving fabric, said apparatus comprising at least two rigid longitudinal frame bars of substantially T-shaped cross-section with an inverted, semi-circular head forming the cross bar thereof.

37. Apparatus according to claim 36, including means for knit weaving said fabric over said bars, said means comprising a one-piece shuttle having a base for winding thread thereon, two outwardly curving points and two inwardly curving points extending from opposite ends of said base, wherein one outwardly and one inwardly curving point is disposed at opposite sides of each of said ends.

38. Apparatus for horizontally knit weaving a piece of flat fabric, said apparatus comprising at least five longitudinal pin bars provided with a series of holes disposed along one side thereof, and displaceable pins seatable within said holes.

39. Apparatus according to claim 38 wherein two of said combs are curved to simulate a desired shape of said fabric and the remaining combs are of substantially rectangular configuration.

40. Apparatus according to claim 38, wherein the holes of at least one of said pin bars perforate said bar and said pins extend through said bar on both sides thereof.

41. A method of making non-run reversible fabric comprising the steps of winding at least a single thread over a first bar, forming a first course of one row step-up, one row step-down loops, then forming a selvage edge by intertwining said thread around the last loop of said course before winding a second course of said loops over a second bar in a reverse direction to that of said first course, and simultaneously interlocking loops in said first course while knit weaving loops in said second course.

42. A method according to claim 41, including the step of looping at least one of said loops in said second course a third time through a loop in said first course to increase the number of stitches in said second course and thereby the width thereof.

43. A method of making non-run reversible tubular fabric comprising the steps of winding at least a single thread over a first bar forming one-fourth of the first course of one row step-up, one row step-down loops, winding at least said single thread over three consecutive bars disposed at right angles to each other to complete said first course, winding a second course of said loops over a fifth bar disposed above and parallel to said first bar, simultaneously interlocking two of the loops on said first bar while knit-weaving each of the loops on said fifth bar before withdrawing said first bar and repeating said steps.

44. A method of making non-run reversible fabric comprising the steps of winding at least a single thread over at least two bars forming a first course of at least two steps-up, two steps-down loops, then winding a second course of said loops over at least a third bar in a reverse direction to that of said first two bars and simultaneously interlocking loops on said first two bars while knit-weaving loops over said third bar.

References Cited

UNITED STATES PATENTS

| 1,721,154 | 7/1929 | Huse. | |
| 2,590,914 | 4/1952 | Adams | 66—1 |
| 3,222,888 | 12/1965 | Turner | 66—1 |

FOREIGN PATENTS

| 1,106,025 | 5/1961 | Germany. |

RONALD FELDBAUM, Primary Examiner